United States Patent
Volkanov et al.

(10) Patent No.: US 10,474,831 B1
(45) Date of Patent: Nov. 12, 2019

(54) LARGE NETWORK ATTACHED STORAGE ENCRYPTION

(71) Applicant: Amazon Technologies, Inc., Seattle, WA (US)

(72) Inventors: Oleksandr Volkanov, Vancouver (CA); Dean Giberson, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 87 days.

(21) Appl. No.: 15/362,721

(22) Filed: Nov. 28, 2016

(51) Int. Cl.
| | |
|---|---|
| *H04L 29/06* | (2006.01) |
| *G06F 21/62* | (2013.01) |
| *H04L 9/08* | (2006.01) |
| *G06F 21/60* | (2013.01) |
| *G06F 9/4401* | (2018.01) |

(52) U.S. Cl.
CPC ........ *G06F 21/6218* (2013.01); *G06F 9/4401* (2013.01); *G06F 21/602* (2013.01); *H04L 9/083* (2013.01); *H04L 9/0822* (2013.01); *H04L 9/0861* (2013.01); *G06F 2221/2107* (2013.01); *H04L 2209/12* (2013.01); *H04L 2209/46* (2013.01)

(58) Field of Classification Search
CPC .. G06F 21/6218; G06F 9/4401; G06F 21/602; G06F 2221/2107; H04L 2209/12; H04L 9/083; H04L 9/0822; H04L 9/0861; H04L 2209/46
USPC ........................................................ 713/165
See application file for complete search history.

(56) References Cited

U.S. PATENT DOCUMENTS

| | | | |
|---|---|---|---|
| 8,261,033 B1 | 9/2012 | Slik et al. | |
| 9,448,614 B2 | 9/2016 | Slik | |
| 10,158,651 B1* | 12/2018 | Nimry | .................... H04L 63/123 |
| 2005/0097063 A1* | 5/2005 | Benaloh | .................. G06F 21/10 |
| | | | 705/71 |
| 2009/0116649 A1* | 5/2009 | Perlman | .................. H04L 9/085 |
| | | | 380/277 |
| 2017/0195303 A1 | 7/2017 | Smith et al. | |

OTHER PUBLICATIONS

International Organization for Standardization/ International Electrotechnical Commission, "Information technology—Trusted Platform Module—Part 1: Overview," International Standard, ISO/IEC 11889-1(E), May 15, 2009, 20 pages.
International Organization for Standardization/International Electrotechnical Commission, "Information technology—Trusted Platform Module—Part 2: Design principles," International Standard, ISO/IEC 11889-2(E), May 15, 2009, 152 pages.

(Continued)

*Primary Examiner* — Mohammad W Reza
(74) *Attorney, Agent, or Firm* — Davis Wright Tremaine LLP

(57) ABSTRACT

Techniques for storing encrypted data using a storage service system are described herein. A computer system of a computation layer of the storage service system receives an encrypted key manifest, which is then decrypted using a cryptoprocessor of the computer system of the computation layer to produce a partition key. The partition key is then provided to a file system abstraction layer so that, as data is provided to the computation layer for storage, the file system abstraction layer can use the partition key to encrypt data and store the encrypted data in the storage layer.

20 Claims, 22 Drawing Sheets

(56) References Cited

OTHER PUBLICATIONS

International Organization for Standardization/International Electrotechnical Commission, "Information technology—Trusted Platform Module—Part 3: Structures," International Standard, ISO/IEC 11889-3:2009(E), 204 pages.
International Organization for Standardization/International Electrotechnical Commission, "Information technology—Trusted Platform Module—Part 4: Commands," International Standard, ISO/IEC 11889-4:2009(E), 254 pages.
Trusted Computing Group, "TPM Main, Part 1 Design Principles," Specification Version 1.2, Level 2 Revision 103, Jul. 9, 2007, 182 pages.
Trusted Computing Group, "TPM Main, Part 1 Design Principles," Specification Version 1.2, Revision 116, Mar. 1, 2011, 184 pages.
Trusted Computing Group, "TPM Main, Part 2 TPM Structures," Specification Version 1.2, Level 2 Revision 103, Jul. 9, 2007, 198 pages.
Trusted Computing Group, "TPM Main, Part 2 TPM Structures," Specification Version 1.2, Revision 116, Mar. 1, 2011, 201 pages.
Trusted Computing Group, "TPM Main, Part 3 Commands," Specification Version 1.2, Level 2 Revision 103, Jul. 9, 2007, 330 pages.
Trusted Computing Group, "TPM Main, Part 3 Commands," Specification Version 1.2, Revision 116, Mar. 1, 2011, 339 pages.

\* cited by examiner

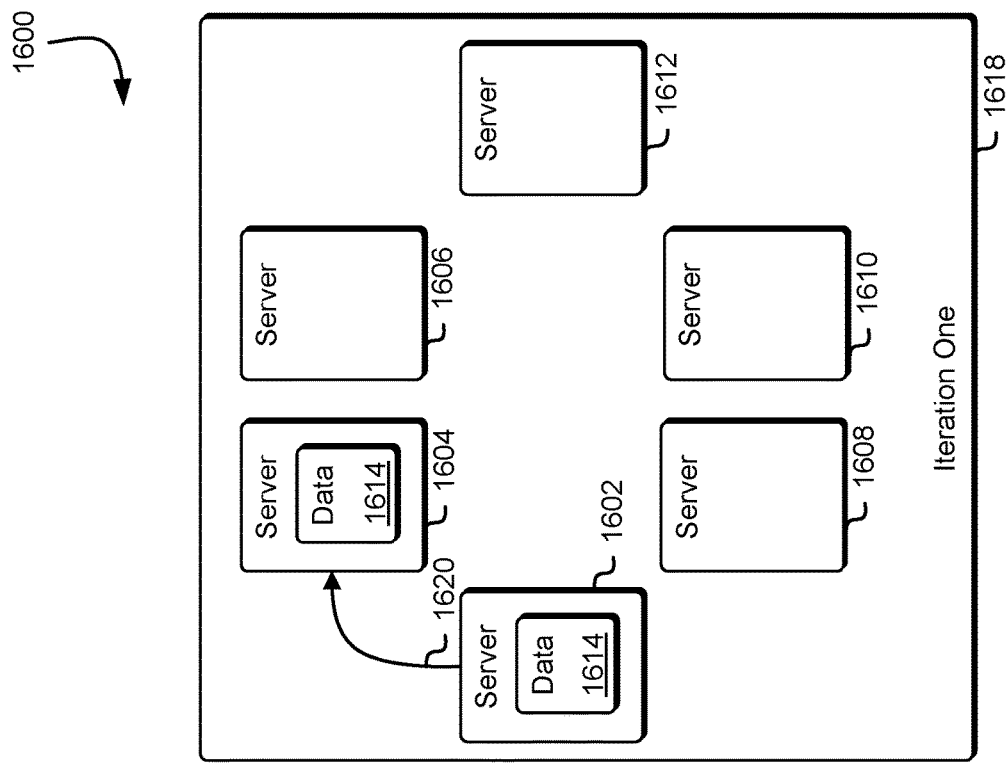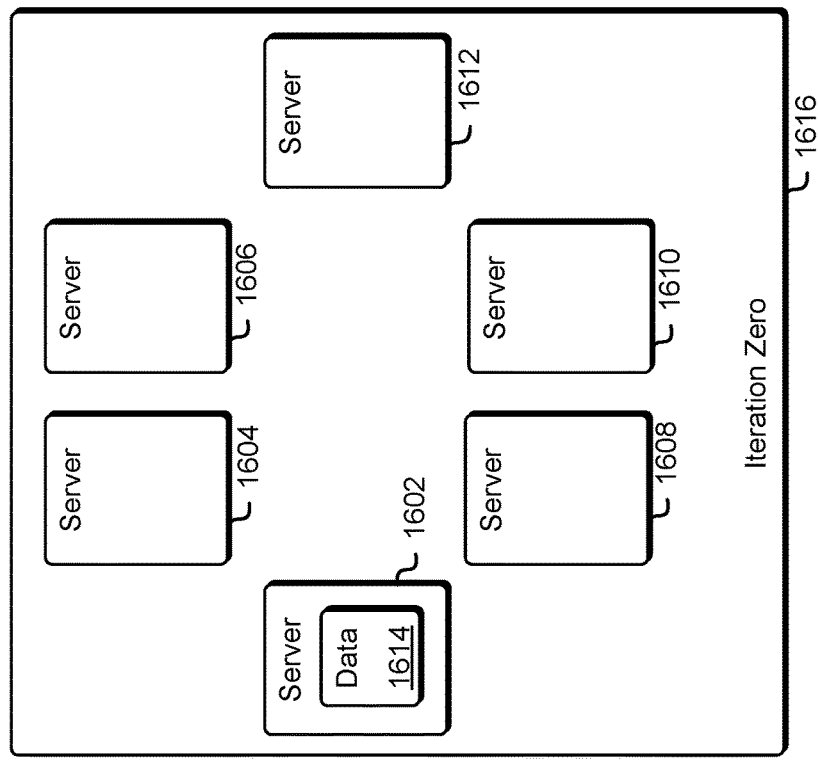
FIG. 16

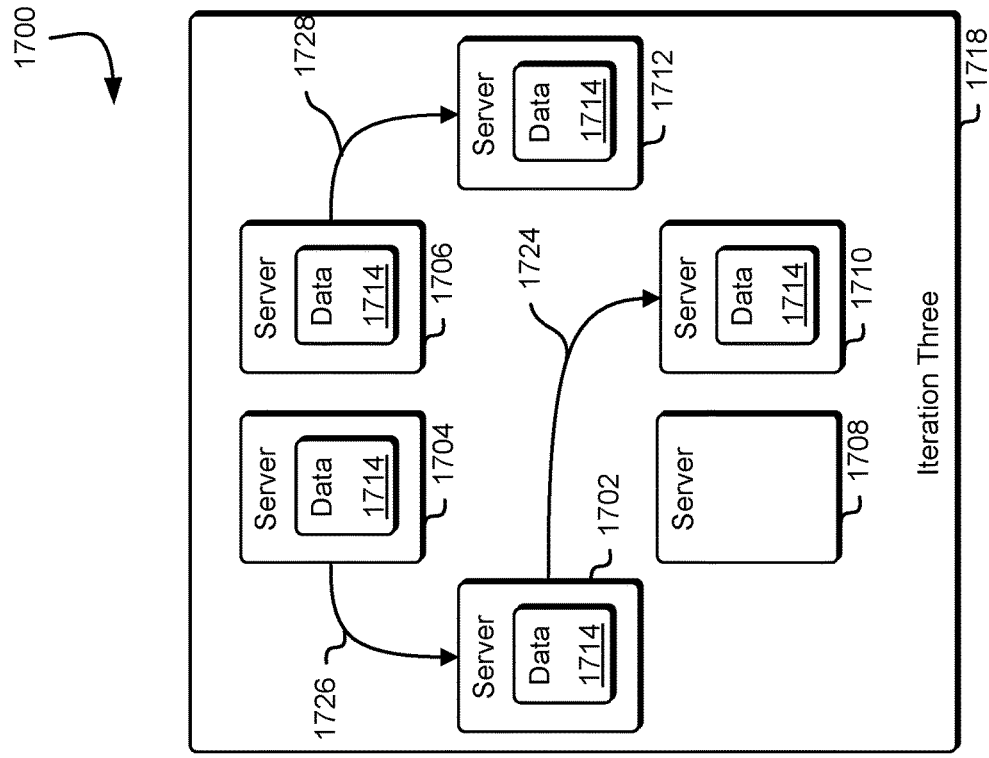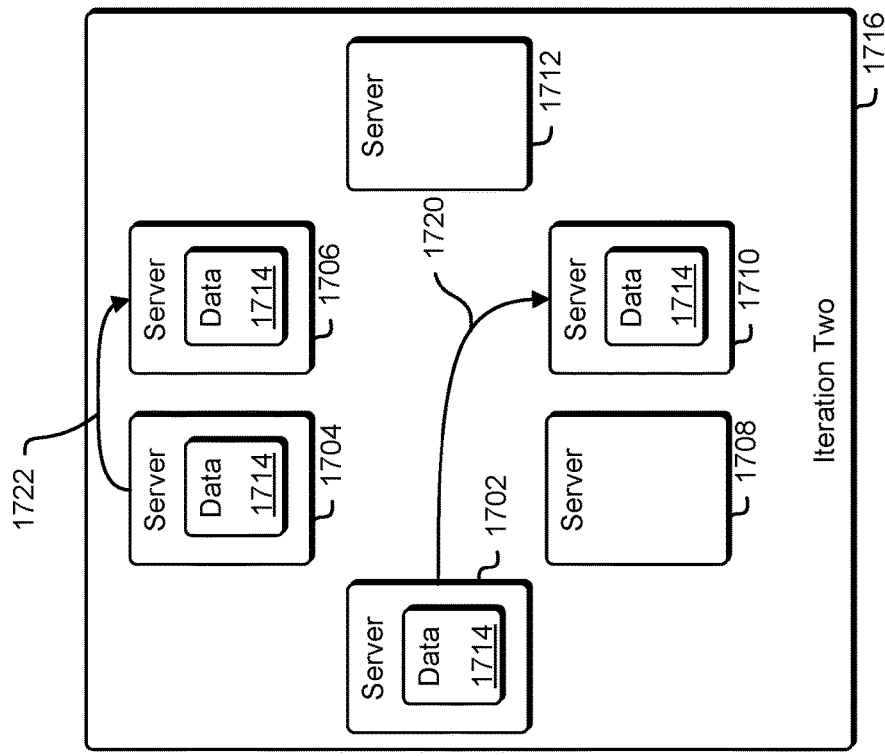
FIG. 17

LARGE NETWORK ATTACHED STORAGE ENCRYPTION

CROSS-REFERENCE TO RELATED APPLICATIONS

This application incorporates by reference for all purposes the full disclosure of co-pending U.S. patent application Ser. No. 15/362,681, filed concurrently herewith, entitled "AUTONOMOUS COMMUNICATION PROTOCOL FOR LARGE NETWORK ATTACHED STORAGE".

BACKGROUND

Modern computer systems make extensive use of network computing and network data storage systems. Such use has proliferated in recent years, particularly in distributed or virtualized computer systems where multiple computer systems may share resources when performing operations and tasks associated with the computer systems. Such computer systems frequently utilize distributed data storage in multiple locations to store shared data items so that such data items may be made available to a plurality of consumers. The resources for network computing and network data storage are often provided by computing resource providers who leverage large-scale networks of computers, servers, and storage drives to enable customers to host and execute a variety of applications and web services. The usage of network computing and network data storage allows customers to efficiently and adaptively satisfy their varying computing needs, whereby the computing and data storage resources that may be required by the customers are added or removed from a large pool provided by a computing resource provider as needed.

The proliferation of network computing and network data storage, as well as the attendant increase in the number of entities dependent on network computing and network data storage, have increased the amount of data that can be stored. Centralizing and consolidating distributed data from, for example, a plurality of locations can lead to very large data sets. Securely storing large amounts of data can cause excessive resource demand for encryption and transmission of the data to the resource provider.

BRIEF DESCRIPTION OF THE DRAWINGS

Various techniques will be described with reference to the drawings, in which:

FIG. 16 illustrates an example environment showing the first two steps of an autonomous communication protocol of a storage service system;

FIG. 17 illustrates an example environment showing the second two steps of an autonomous communication protocol of a storage service system;

DETAILED DESCRIPTION

Figure 1:
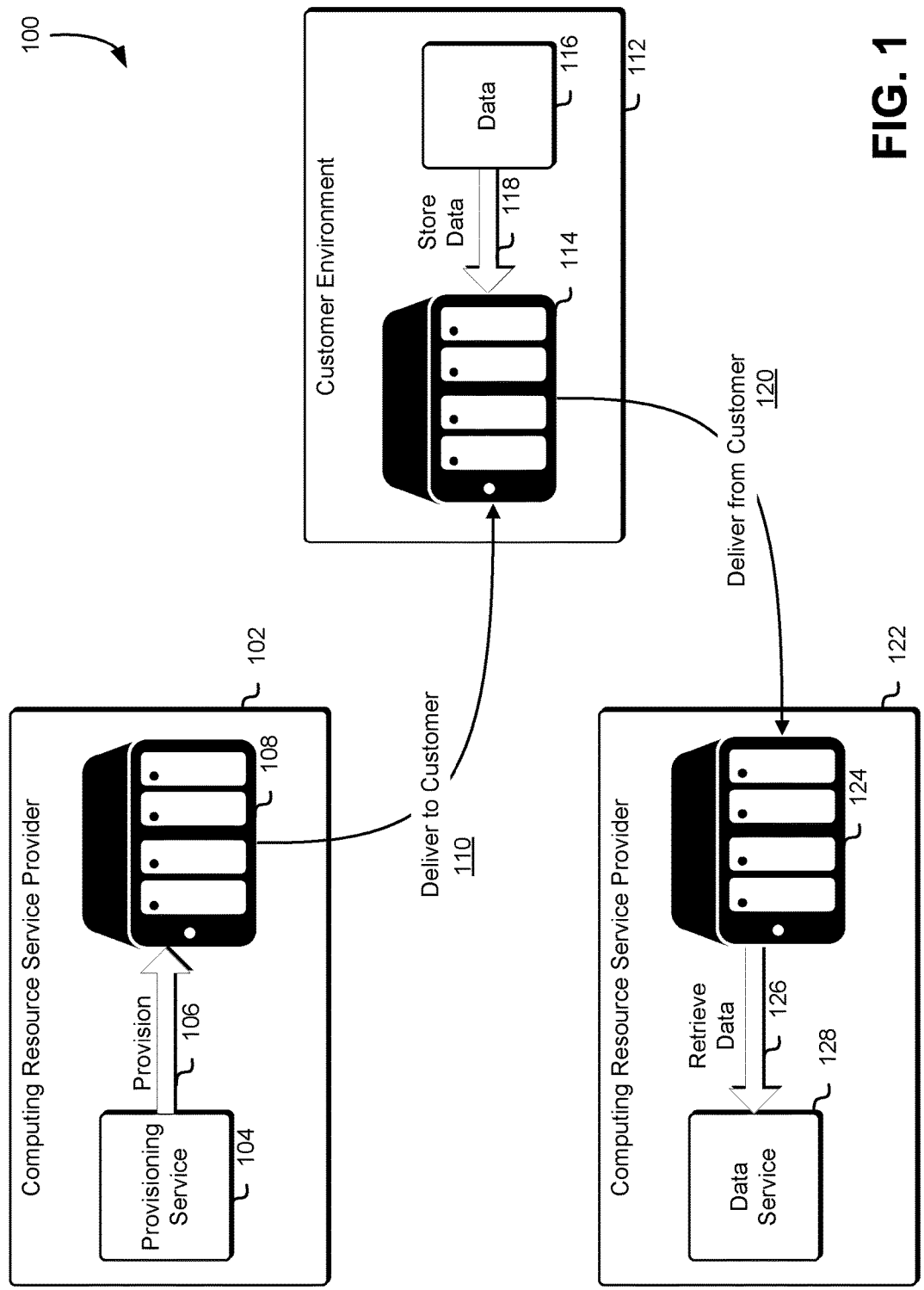
FIG. 1 illustrates an example environment where a storage service system is used to store large data sets.

Moving large amounts of data from an external location to a computing resource service provider environment can be accomplished in a number of ways. For smaller data sets (e.g., megabytes ("MB") or gigabytes ("GB")), data can typically be transmitted over a network in encrypted form and stored at the computing resource service provider location. For larger data sets (e.g., terabytes ("TB"), data can be encrypted at the external location and stored on a storage service system that can be sent to the external location, populated with the encrypted data, and returned to the computing resource service provider for decryption, upload, and storage. Such data on the storage service system is typically encrypted so that it cannot be compromised during return shipment.

Moving very large amounts of data (e.g., petabytes ("PB"), or more) from an external location to a computing resource service provider environment can be accomplished using multiple network attached storage devices, but using such devices can cause a significant resource demand at the external location to encrypt the data before it is stored on the multiple network attached storage devices. By providing a large storage service system device that includes storage as well as computation capacity for encryption, this significant resource demand at the external location is reduced or eliminated.

In one example, a storage service system is configured with a computation layer and a storage layer. The computation layer includes several computation servers that receive data, encrypt the data, and store the encrypted data in the storage layer. The storage layer includes several storage servers that receive the encrypted data from the computation layer and store the encrypted data. A storage service system may have network capabilities so that it can receive the data, power management such as, for example, redundant and protected power supplies, and cooling. The computation servers, the storage servers, and the ancillary systems can be installed in a standard commercial shipping container. The computation servers, the storage servers, and the ancillary systems can also be installed in a dedicated vehicle. Other form factors for the computation servers, the storage servers, and the ancillary systems may also be contemplated such as, for example, modular systems.

Before the storage service system is sent to the external location, it is provisioned at the computing resource service provider. Provisioning may include operations such as installing operating system images on the computation servers and on the storage servers. In order to maintain the security of the computation servers, the computation servers may be diskless (i.e., may not have persistent storage), and the operating system image for the computation servers may be stored in volatile memory such as, for example, a random access memory ("RAM") drive. Storing the operating system image for a computation server in a RAM drive helps maintain the security of the computation servers because the computation servers do not have any state information retained after they are shutdown. Because all data in the storage layer is encrypted, it is not required that the servers of the storage layer are as secure and, because the storage servers are designed to store the encrypted data, they do have storage devices attached.

After the storage service system is provisioned, the storage service system is delivered to the external site. Once at the external site, the storage service system is powered on. Each of the computation servers is verified to ensure that the shared boot image (i.e., the common boot image installed on each of the servers in the layers of the storage service system) in the RAM drive has not been tampered with during transit. Critical operating system files can also be verified to ensure that the computation server has not been tampered with during transit. One method of verifying the boot image and/or the operating system files is to use a secure cryptoprocessor (e.g., a hardware security module ("HSM") or trusted platform module ("TPM")) of the computation server to verify a signature or hash of the shared boot image and/or the operating system files. If the shared boot images and/or the operating system files have been tampered with during transit, the storage service system should not be used to store data.

After the shared boot image and/or operating system files of the servers are verified (i.e., it is verified that the servers have not been tampered with during transit) and all of the servers are up and running, the storage service system is ready for final configuration. The final configuration of the storage service system includes receiving a key manifest that is generated and encrypted at the computing resource service provider. The encrypted key manifest is decrypted within a cryptoprocessor (also referred to herein as "a secure cryptoprocessor") using a key stored in the cryptoprocessor during the provisioning process at the computing resource service provider. The encrypted key manifest includes keys that are provided to the computation layer and used to encrypt files for storage in the storage layer. As described above, if the computation servers are diskless, the encrypted key manifest is provided to the computation layer each time the storage service system is booted.

After the encrypted key manifest is decrypted, the storage service system can begin receiving data, encrypting the data, and storing the encrypted data. If the encrypted key manifest is not successfully decrypted, no keys are provided for the encryption and the secure cryptoprocessor is typically locked. In this instance, the storage service system should also not be used to store data. As may be contemplated, data stored in the storage service system can be redundantly stored in addition to being encrypted. For example, the data stored in the storage service system can have data shards and identity shards so that, in the event of data loss during transit, the encrypted stored data can be recovered.

After the data at the external location is encrypted and stored in the storage service system, the storage service system can be powered down and returned to the computing resource service provider. Before returning the storage service system, the secure cryptoprocessor is cleared so that the encrypted key manifest cannot be decrypted by the storage service system. In a secure environment of the computing resource service provider, the storage service system can then be started up using the same process described above, including reinstalling the key to decrypt the encrypted manifest in the secure cryptoprocessor and verification that the storage service system has not been tampered with in transit. In the secure environment of the computing resource service provider, the effects of tampering can be mitigated by installing new shared boot images on the computation servers. It is assumed that the storage servers do not need to be secure themselves because the data stored thereon is encrypted and thus is secure.

The data on the storage service system is then retrieved from the storage layer, decrypted in the computation layer using the same key manifest, and stored in the computing resource service provider environment using a data storage service. After the data is recovered from the storage service system, the storage devices of the storage layer should be cleared and the storage service system can then be re-provisioned for the next set of external data.

The encryption protocol, which is described in greater detail below, is designed so that the data stored in the storage layer is encrypted and cannot be decrypted without access to several keys in a key hierarchy, all of which are protected by the secure cryptoprocessor. Thus, even if the populated storage service system is compromised during return shipping, the data in the storage layer cannot be accessed.

To enable the storage service system to boot up without access to an external network, the storage service system is configured with an autonomous communication protocol. An autonomous communication protocol allows each of the servers in the computation layer and each of the servers in the storage layer to start up and automatically begin communications with the other servers. For example, after start up, the computation servers in the computation layer are able to determine which servers are leaders (or masters) and which servers are followers (or slaves). The servers in the computation layer make this determination by querying random servers in the computation layer to determine which are followers and which is the leader. Because a consensus can be reached, a leader will eventually be elected.

A first autonomous communication protocol group is created for the computation layer so that the servers in the computation layer can decide who is the leader and can also propagate the encrypted key manifest from the leader to the followers. A second autonomous communication protocol group is created for the storage layer so that the servers in the storage layer can manage the storage for the storage service system and can also monitor each other's health. A third autonomous communication protocol group is created for the storage layer and the leader, so that the servers in the storage layer can communicate their health status to the computation layer.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 where a storage service system is used to store large data sets in accordance with an embodiment. In the example illustrated in FIG. 1, a provisioning service 104 within an environment of a computing resource service provider 102 provisions 106 a storage service system 108. In some embodiments, the computing resource service provider 102 may provide a distributed, virtualized and/or datacenter environment within which one or more applications, processes, services, virtual machines, and/or other such computer system entities may be executed.

The storage service system 108 (also referred to herein as a "mobile storage service system") is a computer system with a plurality of servers. The storage service system 108 is a petabyte-scale storage device that is specifically provisioned for a particular customer's needs and is encrypted for use only by that customer. A petabyte-scale storage device is a device that has a storage capacity of multiple petabytes ("PB") of data. A petabyte is $1000^5$ or $10^{15}$ bytes and a pebibyte ("PiB") is $1024^5$ or $2^{50}$ bytes. Thus, a PiB is about 1.13 PB. Unless otherwise stated or made clear by context, the units for petabytes (PB) and pebibytes (PiB) are used interchangeably herein. In an example, a storage service system 108 with a storage capacity of 32 PiB (e.g., $2^{55}$ bytes) is a petabyte-scale storage device. As may be contemplated, the techniques and methods described herein for petabyte-scale storage devices may be scaled to, for example, exabyte-scale (e.g., multiples of $1000^6$ bytes or approximately $2^{60}$ bytes (an exbibyte)), zettabyte-scale (e.g., multiples of $1000^7$ bytes or approximately $2^{70}$ bytes (a zebibyte)), yottabyte-scale (e.g., multiples of $1000^8$ bytes or approximately $2^{80}$ bytes (a yobibyte)), and beyond.

Some of the servers of the plurality of servers of the storage service system 108 may be configured as a storage layer, and some of the servers of the plurality of servers may be configured as a computation layer (also referred to herein as an "encryption layer"). In an embodiment, the storage service system 108 is configured as an autonomous system when it is not in the environment of the computing resource service provider 102. For example, when the storage service system 108 is not in the environment of the computing resource service provider 102, the storage service system 108 can start up, validate itself (i.e., verify that it has not been tampered with), determine the health of the system by, for example, determining a number of healthy servers in the computation or storage layer, elect a leader of the computation layer, and begin processing data.

The provisioning service 104 may be one of a plurality of services operating within the environment of the computing resource service provider 102. The provisioning service 104 may perform one or more operations to provision the storage service system 108 including, but not limited to, installing operating system images on the servers of the storage service system 108, generating an encrypted key manifest, or storing one or more cryptographic keys on the servers of the storage service system 108. In an embodiment, the provisioning service 104 can request access to other services within the environment of the computing resource service provider 102. For example, the provisioning service 104 can request one or more cryptographic keys from a key management service ("KMS") that may be used to provision 106 the storage service system 108.

After the provisioning service 104 completes the operations to provision 106 the storage service system 108, the storage service system 108 may be delivered 110 to a customer environment 112. The storage service system 114 in the customer environment 112 is configured to store 118 data 116, where the data 116 may include a large amount of data. For example, the data 116 may include multiple petabytes ("PB") of data, where a petabyte is one quadrillion bytes (i.e., $10^{15}$ bytes, which is approximately $2^{50}$ bytes or 1024 terabytes ("TB")). The data may also include considerably more than multiple petabytes of data such as, for example, multiple exabytes, multiple zettabytes, multiple yottabytes, and so on. In an embodiment, the data includes less than multiple petabytes of data and may, for example, include multiple GB or TB of data. As described herein, the storage service system 114 in the customer environment 112 (which is the same as the storage service system 108) has a computation layer and a storage layer. The computation layer is provisioned and configured to receive the data 116, encrypt the data, and store the encrypted data in the storage layer. The computation layer includes a plurality of computation servers that receive the data 116 in parallel, encrypt the data in parallel, and store the data in the storage layer. The storage layer includes a plurality of servers, each of which includes one or more storage devices that, together, store the multiple petabytes of the data 116.

After the data 116 is stored in the storage service system 114 in the customer environment 112, the storage service system 114 may then be delivered 120 from the customer environment 112 to an environment of the computing resource service provider 122. The storage service system 124 in the environment of the computing resource service provider 122 is also configured to retrieve 126 the data and store the retrieved data using a data service 128 of the computing resource service provider 122.

Although illustrated as separate environments, the environment of the computing resource service provider 102 and the environment of the computing resource service provider 122 may be the same environment. In an embodiment, the storage service system 108 is provisioned in an environment of a third party (i.e., not the computing resource service provider and not the customer). In another embodiment, the storage service system 124 can retrieve 126 the data and store the retrieved data using a data service of a third party.

Because the storage service system 108 (which is the same as the storage service system 114 and the storage service system 124) may be used in multiple environments, which may be geographically diverse from each other, the storage service system 108 is transportable from one location (or environment) to another. In an embodiment, the storage service system 108 is installed in a shipping container (e.g., a standard commercial shipping container used to transport goods on ships, trains, planes, and trucks) that can be loaded onto a vehicle and moved from location to location. In another embodiment, the storage service system 108 is installed in a dedicated vehicle such as, for example, a truck, or a bus. The dedicated vehicle can then be driven from location to location. As may be contemplated, the example form factors for the storage service system 108 described herein are merely illustrative examples and other such form factors for the storage service system 108 may be considered as within the scope of the present disclosure.

Figure 2:
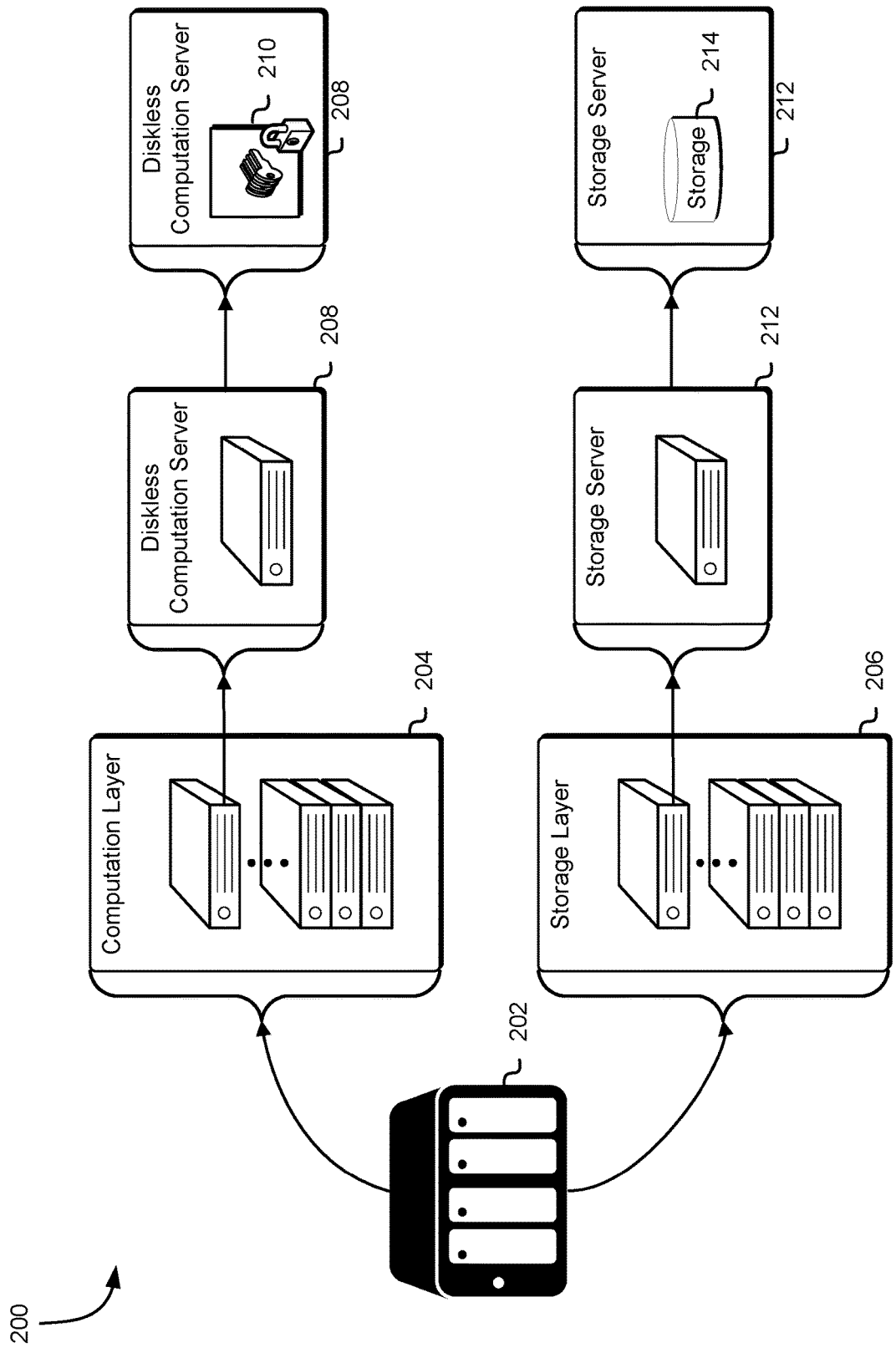
FIG. 2 illustrates an example environment showing a computation layer and a storage layer of a storage service system.

FIG. 2 illustrates an example environment 200 showing a computation layer and a storage layer of a storage service system as described at least in connection with FIG. 1 and in accordance with an embodiment. The storage service system 202 includes a computation layer 204 and a storage layer 206. The computation layer 204 includes a plurality of diskless computation servers. Each diskless computation server 208 of the plurality of diskless computation servers may include processors, memory, network interfaces, graphics interfaces, and other such computer system resources. In an embodiment, each diskless computation server 208 of the plurality of diskless computation servers does not include a permanent storage device beyond a RAM drive for storing an operating system image usable to operate the diskless computation server.

In an embodiment, each diskless computation server 208 of the plurality of diskless computation servers includes a cryptoprocessor 210. The cryptoprocessor 210 may be a hardware security module ("HSM"), a trusted platform module ("TPM"), an enclave, or the like.

In some embodiments, the cryptoprocessor 210 may be a hardware security module (HSM), which may be a dedicated hardware device that operates services whereby the hardware security modules are operable to perform cryptographic operations on request, where requests to the hardware security modules may identify (e.g., provide) data and specify the cryptographic operation(s) to perform and, in some embodiments, parameters for the cryptographic operations to perform, such as a mode of a cryptographic algorithm to utilize. A hardware security module is a physical computing device or other computing device of the customer that is used to manage cryptographic keys on behalf of the customer of the computing resource service provider. For instance, the customer may use the hardware security module to provision a new cryptographic key for encrypting the customer's data. The HSM may utilize various mechanisms to provide tampering resistance and may provide notifications to the customer if an attempt to tamper with a cryptographic key is detected.

In some embodiments, the cryptoprocessor 210 may be a trusted platform module (TPM), which may include a memory subsystem, including a main random access memory (RAM) for storage of instructions and data during program execution and a read only memory (ROM), in which fixed cryptographic information may be stored, such as a hardware secret stored securely within the cryptoprocessor 210 so as to be non-exportable (i.e., inaccessible through any call to the cryptoprocessor 210). The cryptoprocessor 210, in some embodiments, operates wholly or partly in compliance with Trusted Computing Group's TPM Main Specification level 2, Version 1.2, Revision 116, TPM Main Specification level 2, Version 1.2, Revision 133, and/or ISO/IEC 11889, which are incorporated herein by reference. The cryptoprocessor 210 may also store cryptographic keys in RAM and/or processor registers for temporary cryptographic processing. The cryptographic information stored in memory may be used in combination with cryptographic information obtained via a network interface. The one or more cryptographic processors may be used to perform cryptographic operations, such as described above, in the device and may include a random number generator, SHA-2 or other hash generator and an encryption-decryption-signature engine.

In some embodiments, the cryptoprocessor 210 is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs, and/or other devices whose physical characteristics encode information usable as or for a hardware secret.

The cryptoprocessor 210 may be used to secure cryptographic keys stored in the diskless computation server 208 as described herein. The cryptoprocessor 210 may be used to verify data associated with the diskless computation server 208. In various embodiments, data objects stored on the diskless computation server 208 may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security.

In various embodiments, the key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

The storage layer 206 also includes a plurality of servers. Each storage server 212 of the plurality of storage servers may also include processors, memory, network interfaces, graphics interfaces, and other such computer system resources. In an embodiment, each storage server 212 of the plurality of diskless computation servers includes one or more permanent storage 214 devices usable for storing data in the storage service system 202 as described herein.

Figure 3:
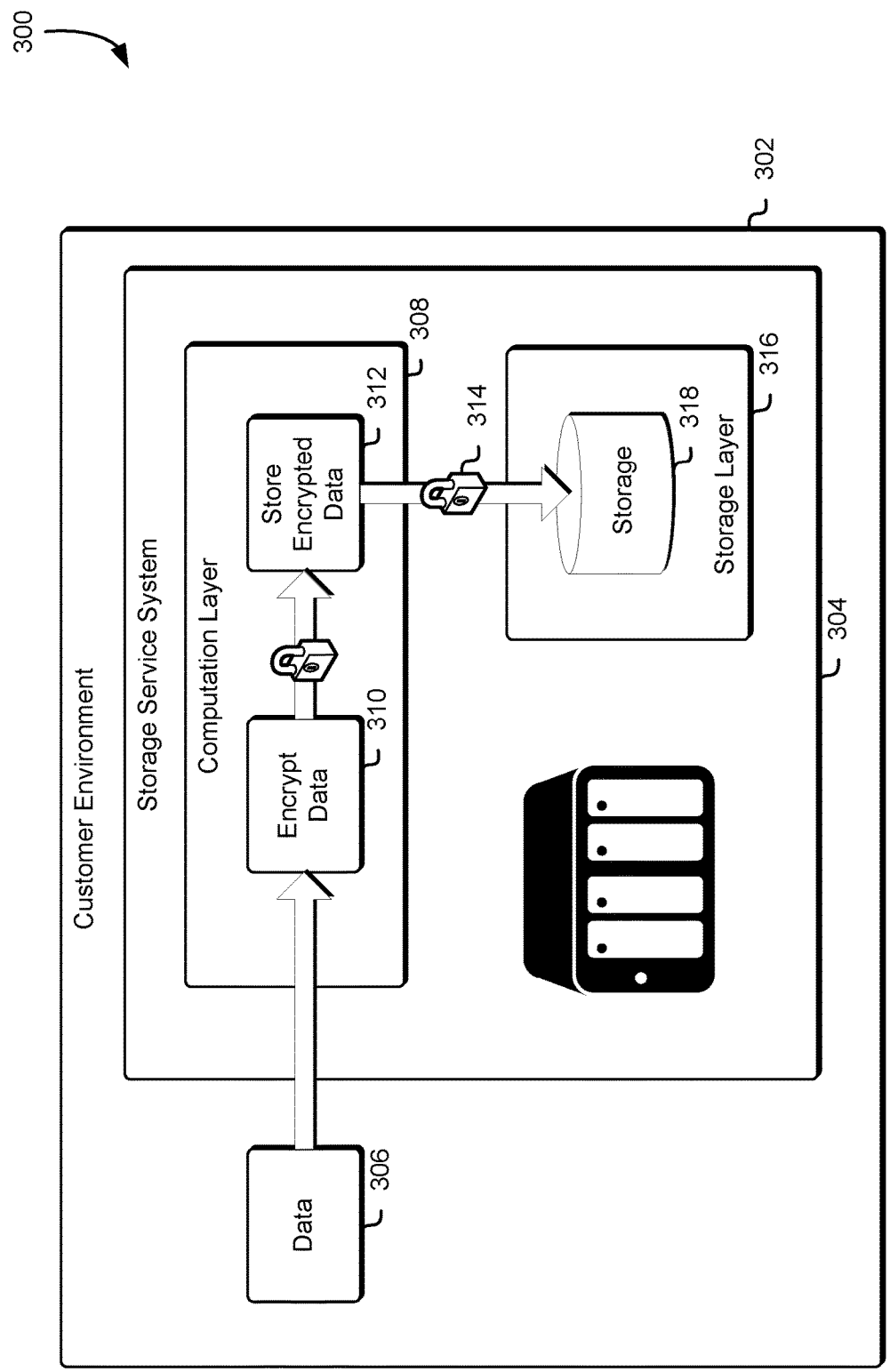
FIG. 3 illustrates an example environment where data is encrypted and stored using a storage service system.

FIG. 3 illustrates an example environment 300 where data is encrypted and stored using a storage service system as described at least in connection with FIG. 1 and in accordance with an embodiment. When, as is shown in the example illustrated in FIG. 3, the storage service system 304 has been delivered to the customer environment 302, the storage service system 304 may be used to receive data 306 from the customer environment 302. In an embodiment, the storage service system 304 can receive data after being delivered to an environment different than the customer environment such as, for example, a third party environment. After the storage service system 304 is powered on, the servers of the computation layer 308 and the servers of the storage layer 316 are booted (i.e., started) and may be organized using a gossip protocol as described herein.

The servers of the computation layer 308 may then begin receiving the data 306, encrypting the data 310, and storing the encrypted data 312 in the storage layer 316. The encrypted data is then provided 314 to the storage layer 316 and stored in data storage 318 in the storage layer. The encrypted data may be stored in the data storage 318 using one or more data storage techniques. For example, the encrypted data may be stored in the data storage 318 using one or more redundancy encoding techniques such as, for example, parity encoding. By storing the encrypted data in the data storage 318 using one or more redundancy encoding techniques, the capacity of the storage service system 304 may be reduced due to the overhead associated with the redundancy encoding, but the reliability of the storage service system 304 may be increased, preventing data loss in transit due to storage failure of the data storage 318.

Figure 4:
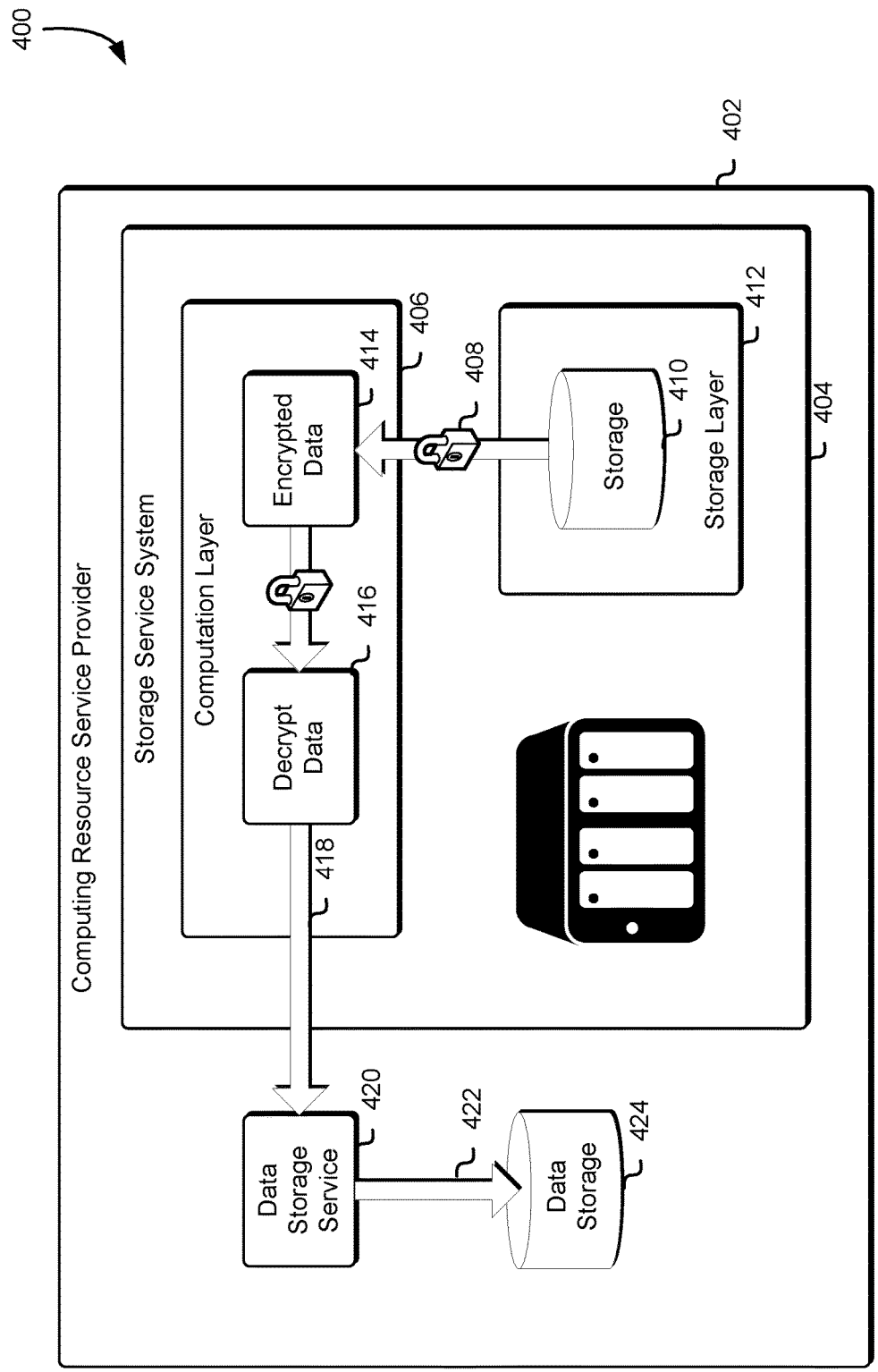
FIG. 4 illustrates an example environment where data is retrieved and decrypted using a storage service system.

FIG. 4 illustrates an example environment 400 where data is retrieved and decrypted using a storage service system as described at least in connection with FIG. 1 and in accordance with an embodiment. In the example illustrated in FIG. 4, the storage service system 404 may be configured to retrieve the stored data after being returned to the environment of the computing resource service provider 402. In an embodiment, the storage service system 404 is configured to retrieve the stored data after being delivered to an environment different than the environment of the computing resource service provider such as, for example, a customer environment or a third party environment.

After the storage service system 404 is powered on, the servers of the computation layer 406 and the servers of the storage layer 412 are booted (i.e., started) and may be organized using a gossip protocol as described herein. The servers of the computation layer 406 may then begin retrieving 408 encrypted data 414 from the storage devices 410 of the storage layer 412. The servers of the computation layer 406 may then begin decrypting 416 the encrypted data 408 retrieved from the storage devices 410 of the storage layer 412 and providing 418 the decrypted data to a data storage service 420 of the computing resource service provider 402. The data storage service 420 then stores 422 the decrypted data in data storage 424.

The data storage service 420 may be a collection of computing resources that operate collectively to process requests to store and/or access data. The computing resources configured to process requests to store and/or access data include at least one of: computer systems (the computer systems including processors and memory), networks, storage devices, executable code, services, processes, modules, or applications. The computing resources configured to process requests to store and/or access data may also include virtual systems that are implemented on shared hardware hosted by, for example, a computing resource service provider. The data storage service 420 may be implemented as a single system or may be implemented as a distributed system, with a plurality of instances operating collectively to process requests to store and/or access data. The data storage service 420 may operate using computing resources (e.g., databases) that enable the data storage service 420 to locate and retrieve data quickly, to allow data to be provided in response to requests for the data.

For example, the data storage service 420 may maintain stored data in a manner such that, when a request to retrieve a set of data is received, the data can be located and provided (or streaming data object can be initiated) in a response to the request. As noted, data stored in the data storage service 420 may be organized into data objects. The data objects may have arbitrary sizes except, in some embodiments, may have constraints on size or durability. Thus, the data storage service 420 may store numerous data objects of varying sizes. The data storage service 420 may store the numerous data objects in storage resources controlled by the data storage service 420, may cause the numerous data objects to be stored using resources controlled by some other service, or may use a combination of these storage locations. The data storage service 420 may also cause the numerous data objects to be redundantly stored using some redundancy encoding technique, may cryptographically encode the numerous data objects, or may use a combination of these and/or some other data preprocessing techniques. The data storage service 420 may also operate as a key value store that associates data objects with identifiers of the data objects that may be used by a user to retrieve or perform other operations in connection with the data objects stored by the data storage service 420. The data storage service 420 may also generate metadata associated with the data objects that may be stored with the data objects such as, for example, a folder name (e.g., the name of the folder where the file is stored), a file name (e.g., the name of the file), a directory name (e.g., the name of the directory when the file is a directory), a time of creation (e.g., the time when the file was created), a time of last modification (e.g., the time when the file was last modified), a time of last access (e.g., the time when the file was last accessed), a checksum for the file, or a user-defined file attribute.

Figure 5:
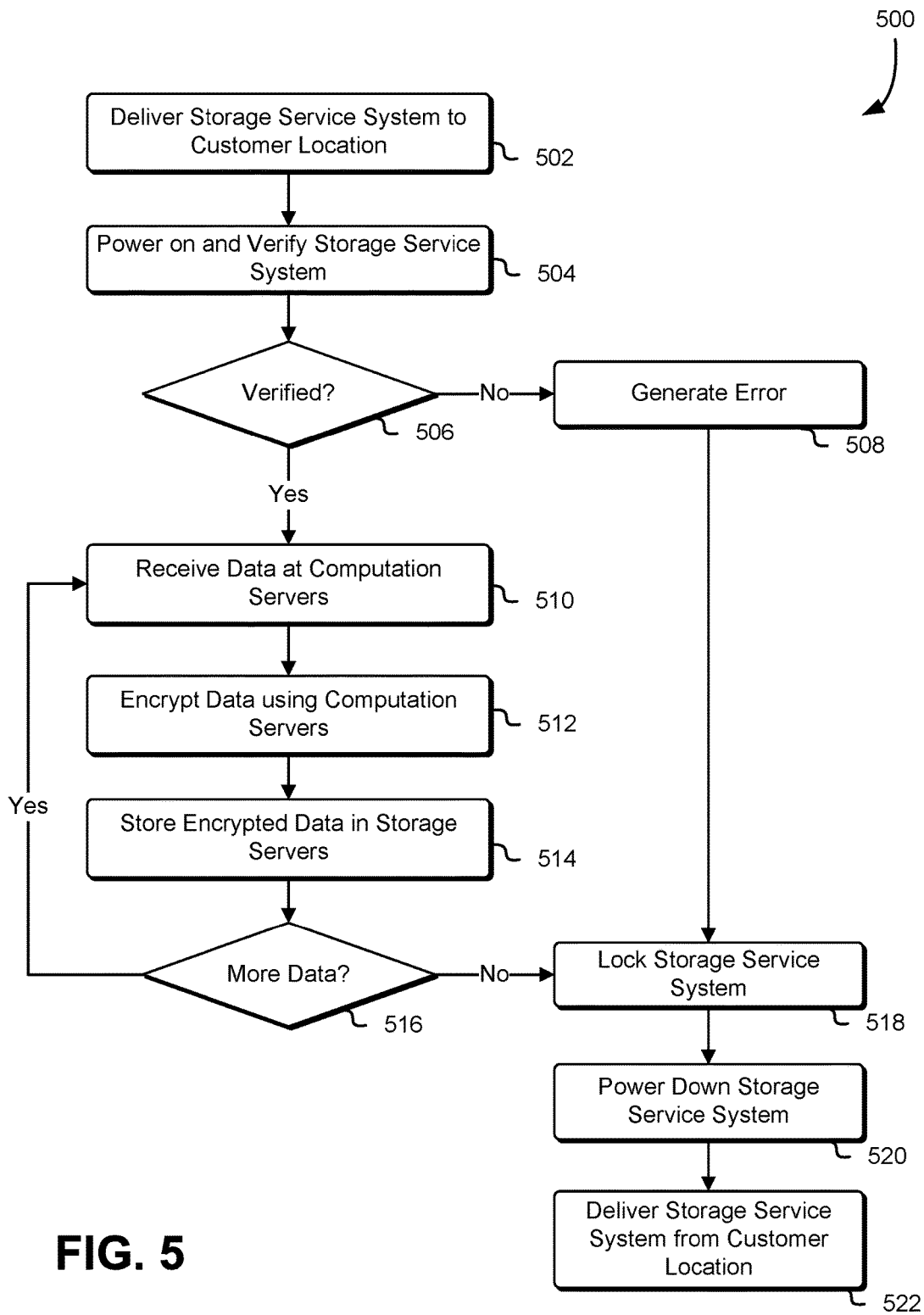
FIG. 5 illustrates an example process for encrypting and storing data using a storage service system.

FIG. 5 illustrates an example process 500 for encrypting and storing data using a storage service system as described at least in connection with FIG. 1 and in accordance with an embodiment. A storage service system such as the storage service system 108 described at least in connection with FIG. 1 may perform at least a part of the example process 500 illustrated in FIG. 5. The storage service system may first be delivered 502 to a customer location. The storage service system may be delivered to the customer location in a commercial shipping container or in a dedicated vehicle. The storage service system may also be delivered to the customer location in multiple shipments that may be assembled at the customer location. For example, the storage service system may be delivered as component parts (i.e., racks, servers, cables, cooling), which may be assembled at the customer location. In an embodiment, the storage service system is delivered to a third party location for encrypting and storing data. In another embodiment, the storage service system is delivered to a facility of the computing resource service provider (i.e., a computing resource service provider environment) for encrypting and storing data. In such an embodiment, the storage service system may be used to deliver the encrypted and stored data to a facility of the customer, may be used to deliver the encrypted and stored data to a facility of a third party, or may be used to deliver the encrypted and stored data to a different facility of the computing resource service provider. For example, the storage service system may be used to move petabyte scale data from one facility (or location) of the computing resource service provider to another facility (or location) of the computing resource service provider.

After the storage service system is delivered to the customer (or other) location, the storage service system may then be powered on and verified 504, using the techniques described below. After the storage service system is powered on, the storage service system may be verified 504 by performing one or more autonomous processes to, for example, verify that the storage service system has not been tampered with during shipment, to verify that all of the servers of the computation layer and/or the storage layer are operating, or to verify that a sufficient number of the servers of the computation layer and/or the storage layer are operating. In an embodiment, the storage service system can function with less than all servers of the computation layer and/or the storage layer operating. In such an embodiment, there may be a specified threshold value that indicates a minimum number of operational servers that should be exceeded before the storage service system is verified.

If the storage service system is not verified 506, the storage service system may generate 508 an error (e.g., by generating a system log entry) and may perform one or more processes to lock 518 the storage service system. Locking the storage service system prevents any data from being loaded onto the storage service system and also prevents any data from being retrieved from the storage service system. In an embodiment, when the storage service system is locked, it may only be unlocked at the computing resource service provider environment. In another embodiment, the storage service system may be unlocked by sending service personnel to unlock the storage service system so that it may be serviced at the customer location. The storage service system may then be powered down 520. Powering down the storage service system may, in some embodiments, remove all cryptographic keys (e.g., the cryptographic keys described herein) from the computation servers. The storage service system may then be delivered 522 from the customer location and, in an embodiment, returned to the computing resource service provider. As described above, the storage service system may also be delivered 522 from a computing resource service provider environment or from a third party environment and may be delivered to a customer location, or to a third party location, or to another computing resource service provider environment.

If the storage service system is verified 506, the storage service system may then begin receiving 510 data at the computation servers, encrypting 512 the data using the computation servers, and storing 514 the data using the storage servers, all as described herein. The storage service system will continue receiving 510, encrypting 512, and storing 514 the data while there is more data 516 to process. When there is no more data 516 to process, the storage service system may perform one or more processes to lock 518 the storage service system as described above. Then, the storage service system may be powered down 520 and delivered 522 from the customer location to the computing resource service provider environment (or to another such location, as described above).

Figure 6:
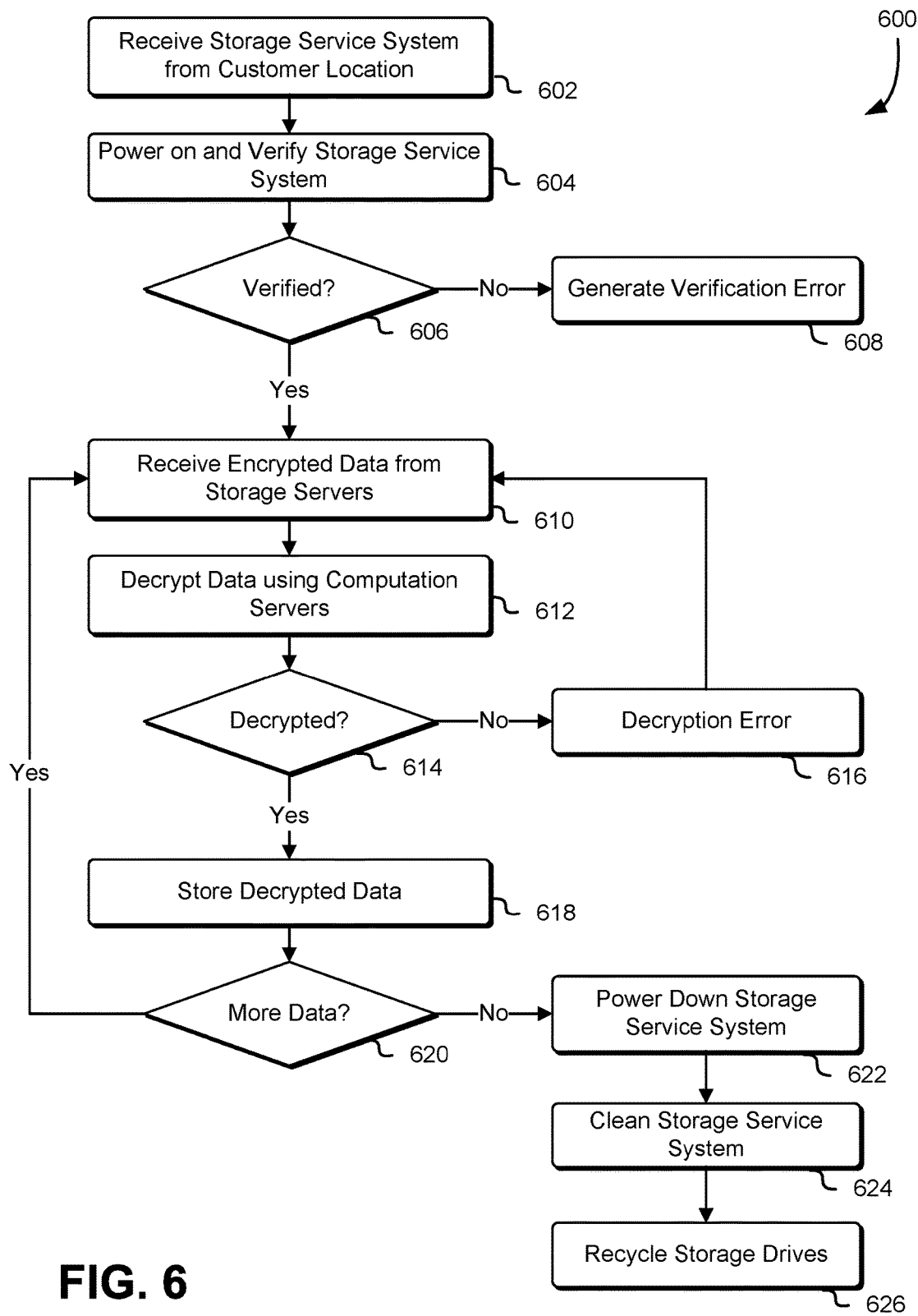
FIG. 6 illustrates an example process for retrieving and decrypting data using a storage service system.

FIG. 6 illustrates an example process 600 for retrieving and decrypting data using a storage service system as described at least in connection with FIG. 1 and in accordance with an embodiment. A storage service system such as the storage service system 108 described at least in connection with FIG. 1 may perform at least a part of the example process 600 illustrated in FIG. 6. First, the storage service system may be received 602 from a customer location (or another such location, as described above). The storage service system may then be powered on and verified 604 as described above in connection with FIG. 5. If the storage service system is not verified 606, the storage service system may generate 608 a verification error. In an embodiment, the verification error may be mitigated by, for example, re-provisioning the servers of the computation layer and generating a new encrypted key manifest, as described herein. In another embodiment, the verification error is mitigated by, for example, placing the storage service system in a secure execution environment so that the verification error may be analyzed. In another embodiment, the verification error is mitigated by extracting the storage devices from the storage layer and individually verifying those storage devices.

If the storage service system is verified 606, the storage service system may begin receiving 610 encrypted data from the storage servers and decrypting 612 the encrypted data using the computation servers, both as described herein. In an embodiment, the storage service system verifies the decryption of the encrypted data and, if the decrypted data is not successfully decrypted 614, the storage service system may generate 616 a decryption error (e.g., in an error log). The storage service system may also perform one or more operations to mitigate the decryption error including, but not limited to, reconstructing the non-decrypted data using redundancy encoding techniques or marking the data in the storage device. In the example process 600 illustrated in FIG. 6, the storage service system may then continue receiving 610 encrypted data from the storage servers. In some embodiments, the storage service system does not continue receiving 610 encrypted data from the storage servers and, instead, terminates the example process 600 illustrated in FIG. 6.

If the decrypted data is successfully decrypted 614, the storage service system may proceed by storing 618 the decrypted data using the techniques described herein. The storage service system may continue receiving 610, decrypting 612, verifying, and storing 618 the data from the storage servers while there is more data 620 to process. When there is no more data 620 to process, the storage service system may be powered down 622. In an embodiment, the storage service system may then be cleaned 624. The storage service system is cleaned 624 by, for example, removing data from the computation servers (e.g., the cryptographic keys and/or the boot images), extracting the storage servers and/or the drives of the storage servers, and/or removing the boot images from the storage servers. In an embodiment, the shared boot images (which may also be referred to herein simply as "boot images") for the computation servers are removed when the computation servers are next provisioned. In an embodiment, the drives from the storage servers may be recycled 626 by, for example, providing the drives to a data storage service so that they may be repurposed by the data storage service and used to store data on behalf of that data storage service.

Figure 7:
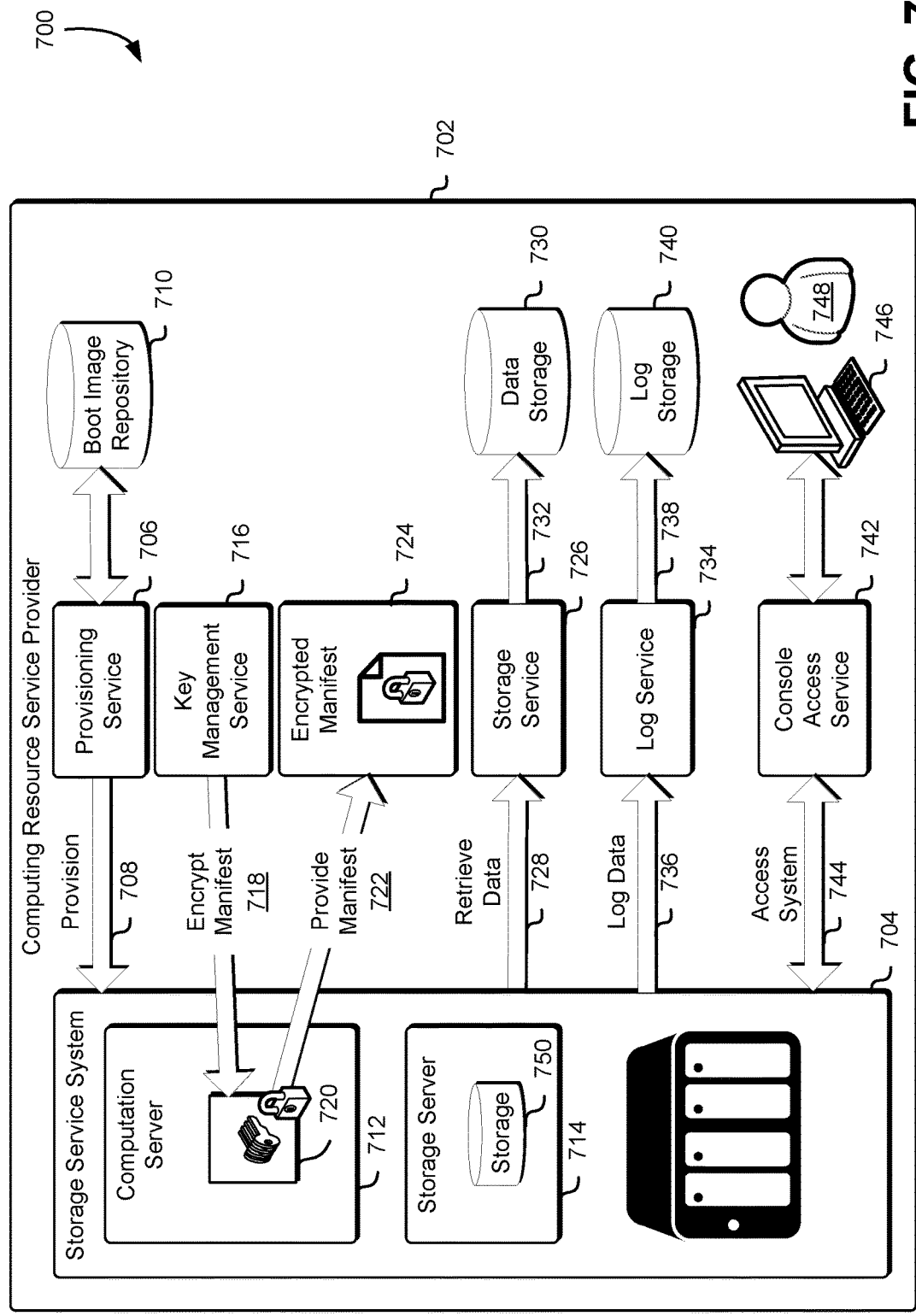
FIG. 7 illustrates an example environment where a storage service system is configured and managed within a secure environment of a computing resource service provider.

FIG. 7 illustrates an example environment 700 where a storage service system as described at least in connection with FIG. 1 is configured and managed within a secure environment of a computing resource service provider and in accordance with an embodiment.

In the example illustrated in FIG. 7, a storage service system 704 within a computing resource service provider 702 environment may be provisioned 708 by a provisioning service 706. The provisioning service 706 may obtain a boot image for each computation server 712 of the computation layer of the storage service system 704 from a boot image repository 710. In an embodiment, each computation server 712 of the computation layer of the storage service system 704 has the same boot image. The provisioning service 706 may also obtain a boot image for each storage server 714 of the storage layer of the storage service system 704 from the boot image repository 710. In an embodiment, each storage server 714 of the storage layer of the storage service system 704 has the same boot image. The provisioning service 706 may also provision the cryptoprocessor 720 of each computation server 712 of the computation layer of the storage service system 704 by, for example, clearing out the cryptoprocessor 720. The provisioning service 706 may also provision the storage 750 of each storage server 714 of the storage layer of the storage service system 704 by, for example, initializing and formatting the storage devices of the storage 750.

A key management service 716 may generate one or more partition keys based on a customer key as described herein and may also generate a manifest key that may be used by the cryptoprocessor 720 to encrypt 718 the key manifest from the partition keys. The manifest key may be stored in the cryptoprocessor and the encrypted manifest 724 may be provided 722 by the cryptoprocessor so that it may be delivered with the storage service system 704.

When the storage service system 704 is returned to the computing resource service provider 702 environment after being populated with data, the data may be retrieved 728 from the storage service system 704 using a storage service 726 as described herein. The storage service 726 (also described herein as a "data storage service") may store 732 the retrieved data in data storage 730 so that it may be accessed by other services of the computing resource service provider 702. When the storage service system 704 is returned to the computing resource service provider 702 environment, a log service 734 may also obtain log data 736 from the storage service system 704 and store 738 that log data in log storage 740 so that that log data may be processed and/or analyzed by other services of the computing resource service provider 702.

Finally, when the storage service system 704 is located in the computing resource service provider 702 environment, an access system 744 may be used to allow a user 748 (i.e., an administrator) to access the storage service system 704 using a computing device 746. The user 748 may access the storage service system 704 using a console access service 742 which may be a webservice. In an embodiment, the console access service 742 is only available when the storage service system 704 is located in the computing resource service provider 702 environment. In another embodiment, the console access service 742 has reduced permissions when the storage service system 704 is not located in the computing resource service provider 702 environment.

Figure 8:
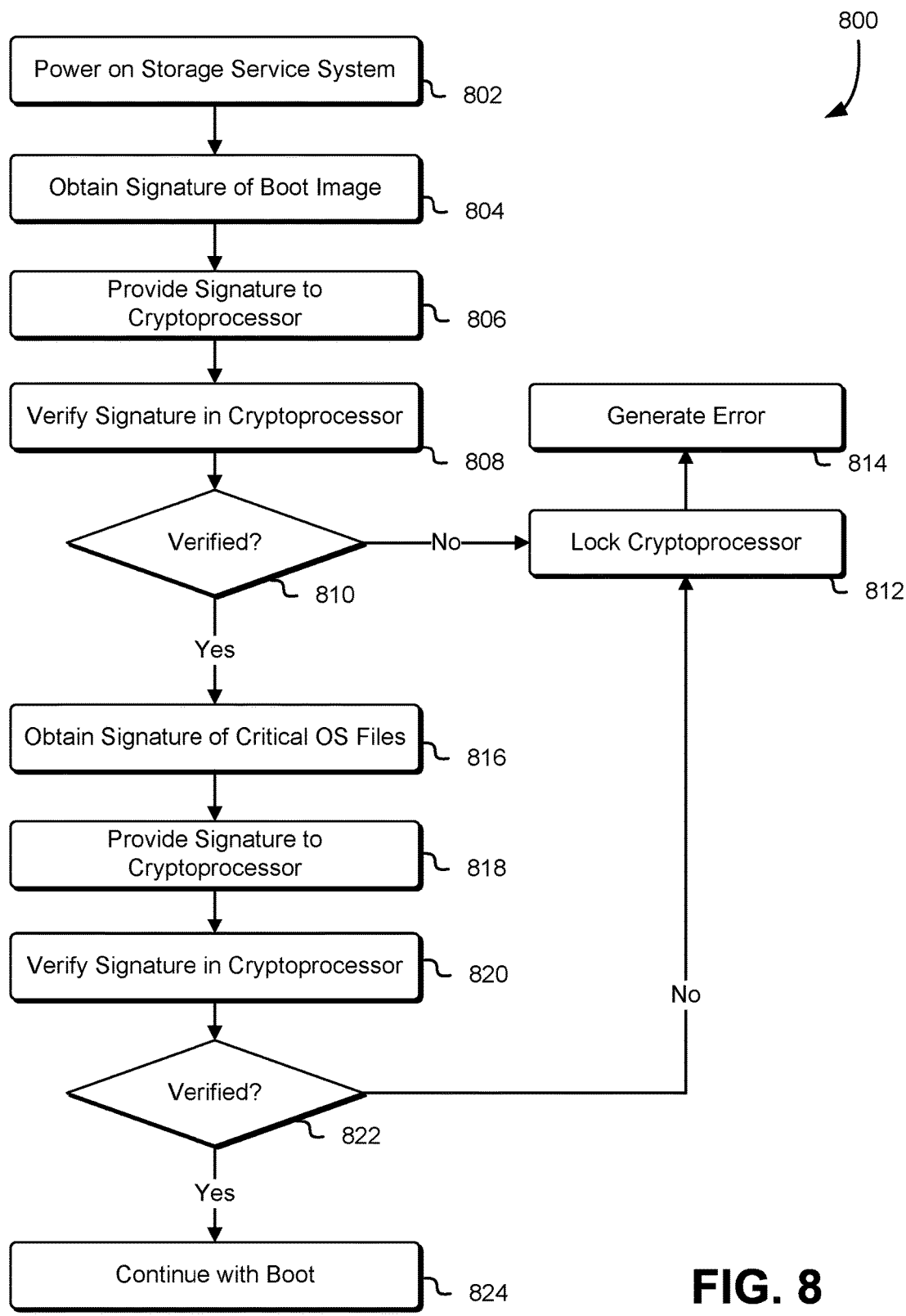
FIG. 8 illustrates an example process for booting and verifying a storage service system.

FIG. 8 illustrates an example process 800 for booting and verifying a storage service system as described at least in connection with FIG. 1 and in accordance with an embodiment. A storage service system such as the storage service system 108 described at least in connection with FIG. 1 may perform at least a part of the example process 800 illustrated in FIG. 8. After the storage service system is powered on 802 as described above, each computation server of the computation layer of the storage service system may first obtain 804 a signature of the boot image used to boot that server. The signature of the boot image may be a hash of the boot image or may be a redundancy check of the boot image. The signature of the boot image is determined during the boot process by, for example, calculating a hash of the boot image.

The computation server of the computation layer of the storage service system may then provide 806 the signature of the boot image to a cryptoprocessor such as, for example, a TPM, an HSM, a PUF, or an Enclave. The cryptoprocessor may then be used to verify 808 the signature of the boot image. If the signature of the boot image is verified, it may be inferred that the boot image was not altered or otherwise tampered with since provisioning. The signature of the boot image is generated at provisioning (i.e., at the computing resource service provider environment) and stored in the cryptoprocessor. Thus, in order to alter the boot image, an attacker must also have access to the boot image and also to the cryptoprocessor so as to alter the signature of the boot image to match the altered boot image. It should be noted that the example process 800 illustrated in FIG. 8 may also be used to verify that the boot image was not altered or corrupted since provisioning due to, for example, storage errors.

If the signature of the boot image is not verified 810, the cryptoprocessor may then be locked 812. A locked cryptoprocessor does not allow any commands to be issued to the cryptoprocessor nor does it allow any cryptographic results (e.g., of a decryption) to be produced. A locked cryptoprocessor prevents that computation server from performing the methods and techniques described herein to receive and/or store data. In an embodiment, the storage service system generates 814 an error by, for example, using a logging service as described herein. As described above, in some embodiments, the storage service system can operate with one or more of the cryptoprocessors in a locked state as the locked cryptoprocessor only prevents the computational server that hosts the locked cryptoprocessor from operating. In an embodiment, the storage service system will operate provided that a minimum number of operational servers in the computation layer exceeds a threshold value. In another embodiment, the storage service system will not operate if any of the cryptoprocessors is in a locked state. The storage service system may then generate 814 a verification error by, for example, logging the verification error using a logging service.

If the signature of the boot image is verified 810, the storage service system may continue 824 with the boot of the server or may, in an embodiment, obtain 816 signatures for critical operating system ("OS") files, may provide 818 the signatures of the critical OS files to the cryptoprocessor, and may verify 820 the signatures of the critical OS files using the cryptoprocessor. The critical OS files may be designated at provisioning and may include files critical to the functioning of the server including, but not limited to, the file system abstraction layer files. The file system abstraction layer is described in more detail below. If the signatures of the critical OS files are not verified 822, the cryptoprocessor may then be locked 812 as described above and the storage service system may then generate 814 a verification error as described above. If the signatures of the critical OS files are verified 822, the storage service system may continue 824 with the boot of the server.

In an embodiment, each of the servers in the computation layer may perform the verification for that server. In an embodiment, a leader of the computation layer of the storage service system, after verifying the boot image used to boot the leader, may verify the other servers (e.g., the followers) by obtaining and verifying a signature of the boot image for each of the other servers in that layer or obtaining and verifying a signature of the boot image for a subset of the other servers. For example, in an embodiment where each of the servers in a layer (e.g., the computation or storage layer) is configured at provisioning with an identical boot image, the storage service system may first verify that each of the boot images are still identical and may then obtain 804 and verify 808 a signature of the boot image from a single server of that layer.

In an embodiment, after the boot images for the servers of the computation layer are verified, the servers of the computation layer may then obtain 804 signatures from the servers of the storage layer and verify 808 those signatures. In another embodiment, the leader of the computation layer may obtain 804 and verify 808 the signatures of the storage layer. The servers of the computation layer may also verify the signatures for critical OS files of the servers of the storage layer, as described above.

Figure 9:
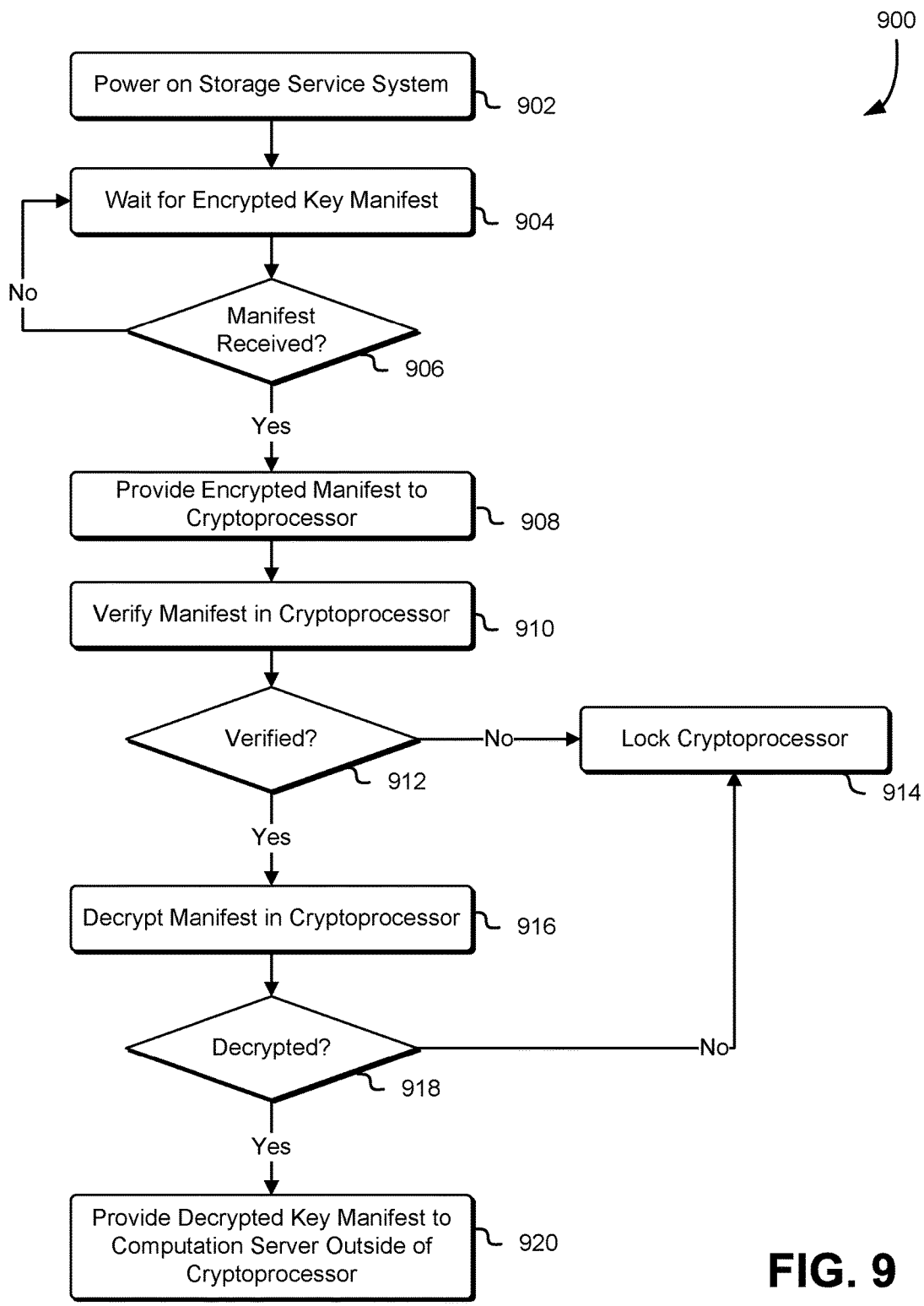
FIG. 9 illustrates an example process for configuring encryption of a storage service system.

FIG. 9 illustrates an example process 900 for configuring encryption of a storage service system as described at least in connection with FIG. 1 and in accordance with an embodiment. A storage service system such as the storage service system 108 described at least in connection with FIG. 1 may perform at least a part of the example process 900 illustrated in FIG. 9. After the storage service system is powered on 902 as described above, a computation server waits 904 for an encrypted key manifest. The encrypted key manifest is generated when the storage service system is provisioned and provided to the storage service system so that the storage service system can receive data and/or provide the stored data when the storage service system is, for example, returned to the computing resource service provider. In an embodiment, only the leader of the computation layer performs the example process 900 illustrated in FIG. 9 where the leader of the computation layer is selected according to the gossip protocol as described herein. In another embodiment, a plurality of servers of the computation layer performs the example process 900 illustrated in FIG. 9.

When the encrypted key manifest is received 906, the computation server may then provide 908 the encrypted key manifest to the cryptoprocessor of the computation server. The cryptoprocessor may then verify 910 the encrypted key manifest by, for example, verifying a signature or hash of the encrypted key manifest that is generated at provisioning time and stored in the cryptoprocessor. If the encrypted key manifest is not verified 912, the cryptoprocessor may be locked 914 as described above. If the encrypted key manifest is verified 912, the cryptoprocessor may then decrypt 916 the encrypted key manifest to produce a decrypted key manifest. The encrypted key manifest is decrypted using a cryptographic key (e.g., a manifest key) that is stored in the cryptoprocessor when the storage service system is provisioned. In an embodiment, the verification and decryption of the encrypted key manifest is performed as a single step in the cryptoprocessor. In another embodiment, the decrypted key manifest is verified in the cryptoprocessor after the encrypted key manifest is decrypted. The verification of the decrypted key manifest may be performed instead of or in addition to the step to verify 910 the encrypted key manifest. As described above, the decrypted key manifest contains one or more cryptographic keys (e.g., partition keys) usable by the storage service system to store and retrieve encrypted data using the storage layer.

If the encrypted key manifest is decrypted 918, the storage service system provides 920 the decrypted manifest to the computation server outside of the cryptoprocessor. If the encrypted key manifest is not decrypted 918, the cryptoprocessor is locked 914 as described above. Although not illustrated in FIG. 9, after the storage service system provides 920 the decrypted manifest to the computation server outside of the cryptoprocessor, that computation server may provide the decrypted manifest to other computation servers in the computation layer. In an embodiment where only the leader of the computation layer performs the example process 900 illustrated in FIG. 9, that leader provides the decrypted manifest to the other servers (e.g., the followers).

Figure 10:
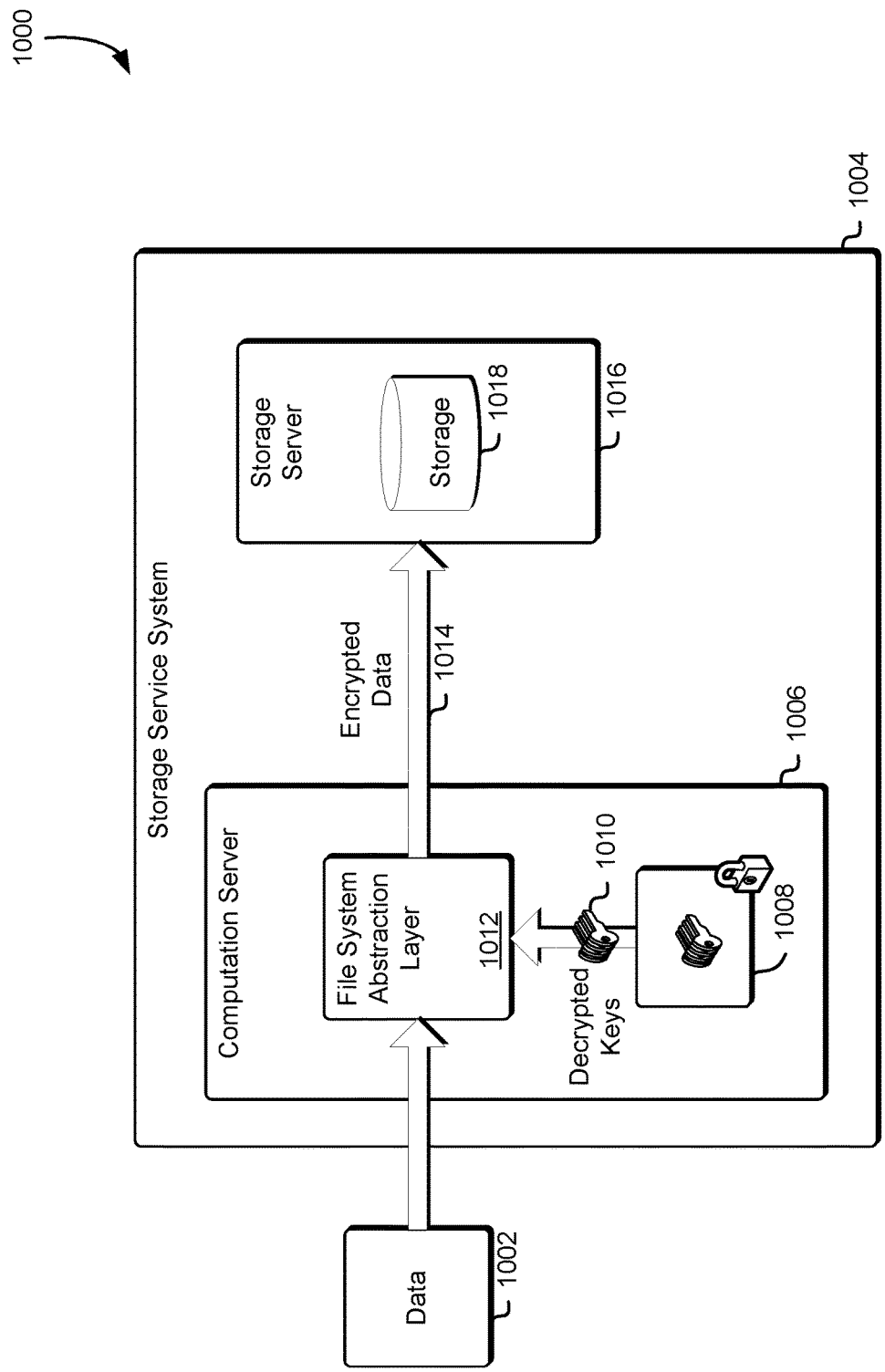
FIG. 10 illustrates an example environment where encryption of incoming data is performed on the fly using a storage service system.

FIG. 10 illustrates an example environment 1000 where encryption of incoming data is performed on the fly using a storage service system as described at least in connection with FIG. 1 and in accordance with an embodiment. In the example illustrated in FIG. 10, data 1002 is received at a storage service system 1004 as described above. A computation server 1006 (e.g., a diskless computation server) of the computation layer of the storage service system receives the data and stores encrypted data 1014 in a storage device 1018 of a storage server 1016 of the storage layer of the storage service system.

The computation server 1006 encrypts the data 1002 as it is received (also referred to herein as encrypting "on the fly") using a file system abstraction layer 1012. The file system abstraction layer 1012 performs encryption on the file using the decrypted keys 1010 obtained from the decrypted key manifest, which is obtained from the cryptoprocessor 1008 as described above at least in connection with FIG. 9. The file system abstraction layer is an abstraction of the file system of the storage device 1018 of a storage server 1016 of the storage layer of the storage service system. The file system abstraction layer performs encryption on the fly using the decrypted keys 1010 by substituting a write command from the computation server with an "encrypt and write" command. The processes of the computation server receive the data 1002 and, after the data is organized and processed as described herein (e.g., divided into chunks, seeded with random values, provided with headers and metadata), the data is stored by issuing a write command (or a store command) to the file system abstraction layer 1012. The file system abstraction layer 1012 receives the data to be stored as plaintext (i.e., unencrypted data) and, using the decrypted keys 1010, encrypts the data before sending the encrypted data 1014 to be stored in a storage device 1018 of a storage server 1016 of the storage layer of the storage service system.

In an embodiment, the file system abstraction layer 1012 may be one of a plurality of file system abstraction layers present in the storage service system. For example, a second file system abstraction layer may be provided so that the totality of the storage of the storage service system is presented as a single file system. Such a second file system abstraction layer provides a mapping between the presented single file system and the plurality of file systems of the storage layer of the storage service system. Such a second file system abstraction layer may be implemented by the leader of the computation layer of the storage service system, or may be implemented as a distributed file system abstraction layer among the servers of the computation layer of the storage service system, or may be implemented as a distributed file system abstraction layer among the servers of the storage layer of the storage service system.

It should be noted that while the example environment 1000 illustrated in FIG. 10 shows storing data in the storage service system by receiving data 1002, encrypting that data on the fly in the file system abstraction layer 1012 using the decrypted keys 1010, and storing that encrypted data 1014 in a storage device 1018 of a storage server 1016 of the storage layer of the storage service system, the same processes are used for providing the data from the storage service system to, for example, a data storage service of the computing resource service provider. That is, encrypted data is retrieved from the storage device of the storage server and decrypted on the fly in the file system abstraction layer 1012 using the decrypted keys 1010 before the data is provided to the data storage service of the computing resource service provider.

Figure 11:
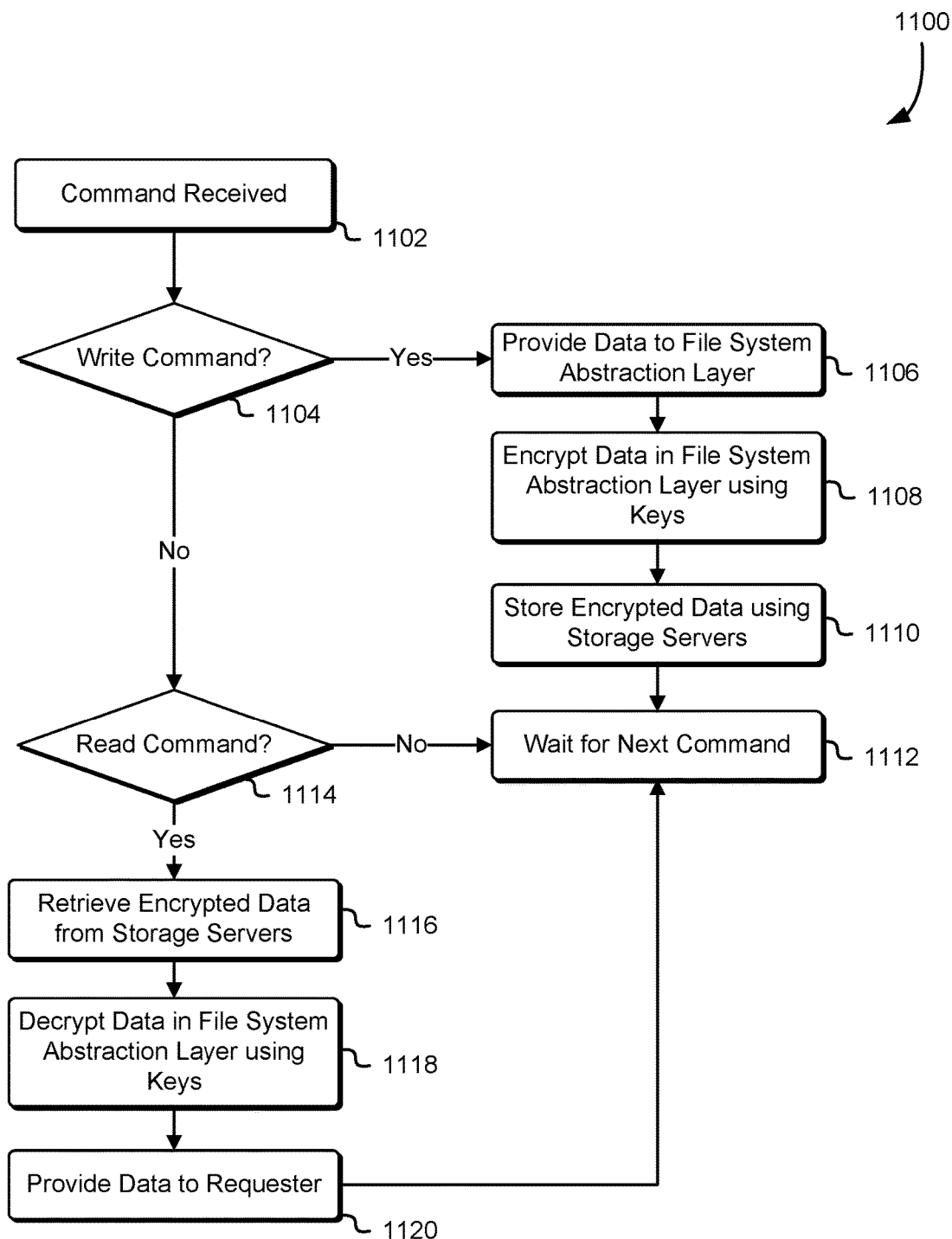
FIG. 11 illustrates an example process for processing data storage commands using a storage service system.

FIG. 11 illustrates an example process 1100 for processing data storage commands using a storage service system as described at least in connection with FIG. 1 and in accordance with an embodiment. A computation server with a file system abstraction layer of a storage service system such as the storage service system 108 described at least in connection with FIG. 1 may perform at least a part of the example process 900 illustrated in FIG. 9. A command such as a command to store data or retrieve data is received 1102 by the computation server. The command may also be generated by the computation server.

If the command is a write command 1104, the computation server may provide 1106 the command with the data to be written to the file system abstraction layer in plain text as described above. The file system abstraction layer may then, in response to the write command, encrypt 1108 the data using the decrypted keys, store 1110 the encrypted data using the storage servers of the storage layer of the storage service system, and wait 1112 for the next command.

If the command is a read command 1114, the computation server may retrieve 1116 encrypted data that is required for the read from the storage servers of the storage layer of the storage service system, decrypt 1118 the data using the decrypted keys, provide 1120 the decrypted data to the requester (i.e., to a process of the computation server) and wait 1112 for the next command.

Figure 12:
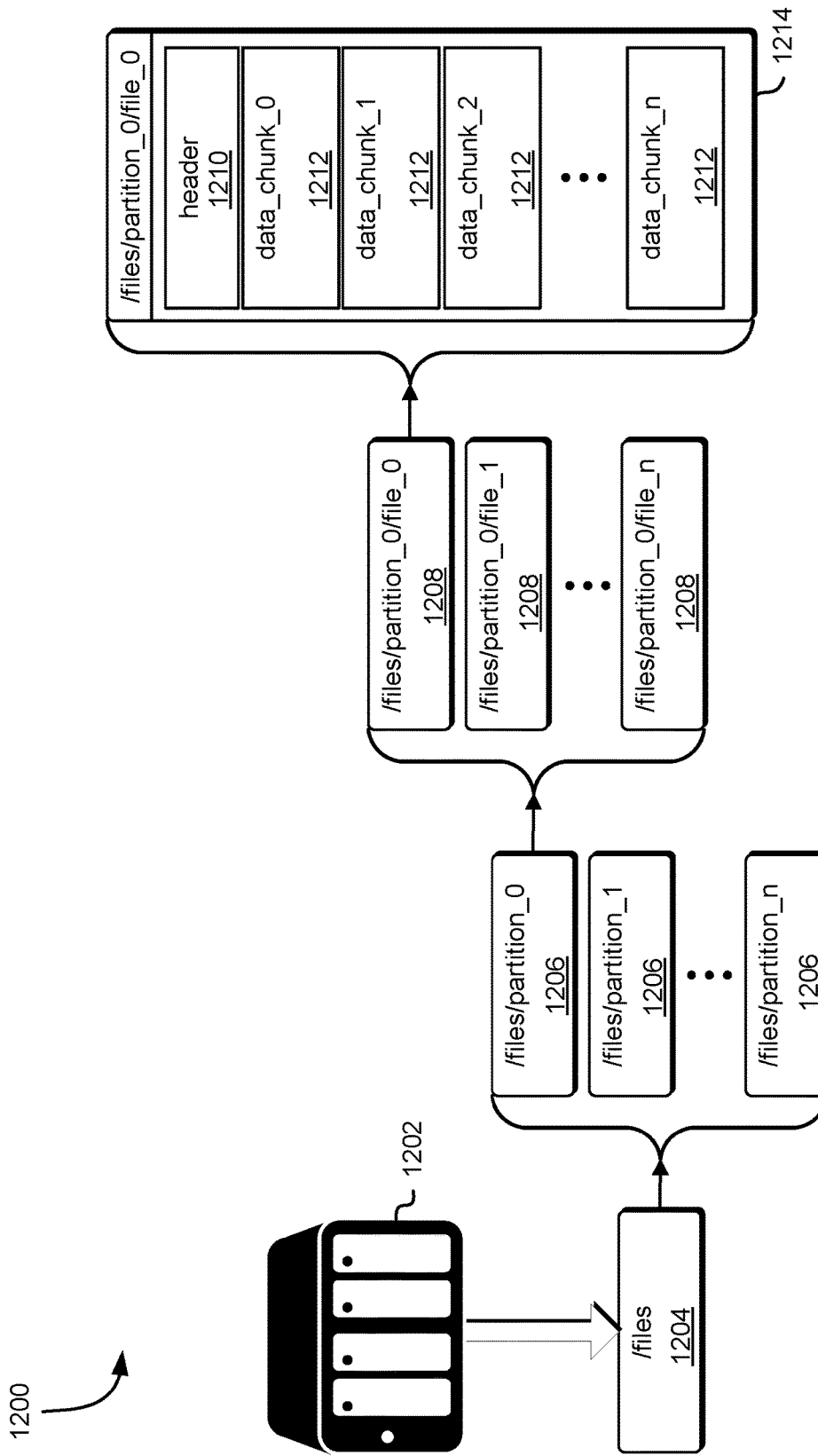
FIG. 12 illustrates an example environment showing a data storage hierarchy of a storage service system.

FIG. 12 illustrates an example environment 1200 showing a data storage hierarchy of a storage service system as described at least in connection with FIG. 1 and in accordance with an embodiment. The storage service system 1202 is presented as a single file system 1204. The single file system 1204 is at least a petabyte-scale file system that is backed by the combined storage devices of the storage servers of the storage service system. In an embodiment, the petabyte-scale file system is comprised of a plurality of smaller storage devices. For example, if each storage server has 128 TB of storage (e.g., 16 drives, each which has a storage capacity of 8 TB), and there are 1212 storage servers, then the petabyte-scale file system is presented as a single drive with a 64 PB capacity. It should be noted that a portion of the 64 PB capacity may be used to redundantly store the encrypted data on the storage service system so that a storage service system with 1212 storage servers with 128 TB storage on each may be presented as a single drive with a 48 PB capacity (i.e., if 25% of the storage is used for redundancy). As may be contemplated, the number of storage servers, the amount of storage on each storage server, the total capacity of the storage service system, and the amount of storage used for redundancy described herein are illustrative examples and other numbers of storage servers, amounts of storage on each storage server, total capacities of the storage service system, and/or amounts of storage used for redundancy may be considered as within the scope of the present disclosure.

The single file system 1204 of the storage service system may be divided into one or more partitions 1206. In an embodiment, the storage service system has at least one partition (also referred to herein as a "bucket"). In an embodiment, there is an upper limit on the number of partitions. Each partition may include one or more files 1208. The one or more files 1208 may contain data or may be directories or subfolders. For example a partition "partition_0" may include a file "file_0" and a file "file_1." The partition "partition_0" may also include a directory "directory_2" that may contain a file "file_2" and a file "file_3." The directory "directory_2" may also include subdirectories (e.g., "directory_3"). Directories, subdirectories, and files are nodes of a file system, which may include data (e.g., data files) and/or metadata that is stored in other nodes of the file system.

A data file 1214 may include a header 1210 describing the file and one or more data chunks 1212. A data chunk is a subset of the set of data stored in the data file and is the size of the encrypted data that can be read from and written to the storage layer of the storage service system. A data chunk may be encrypted by the storage service system to produce an encrypted chunk of data and may also be decrypted by the storage service system to produce a decrypted chunk of data. The size of the data chunk may depend on the type of storage used by the storage service system, the type of encryption used by the storage service system, and other factors. In an embodiment, a data chunk is 1 MB and includes data as well as additional metadata that may be stored with the data chunk. Data to be written to the storage service system may be stored in a buffer that is sized so that, when the buffer is processed and encrypted, the resulting buffer is the size of the data chunk. If data is to be written to a data chunk that has previously stored data, the data chunk may be read back from the storage layer of the storage service system and decrypted. The new data is then written to the decrypted chunk, the data is encrypted, and the data stored back to the storage layer of the storage service system. This process is described in more detail below.

Figure 13:
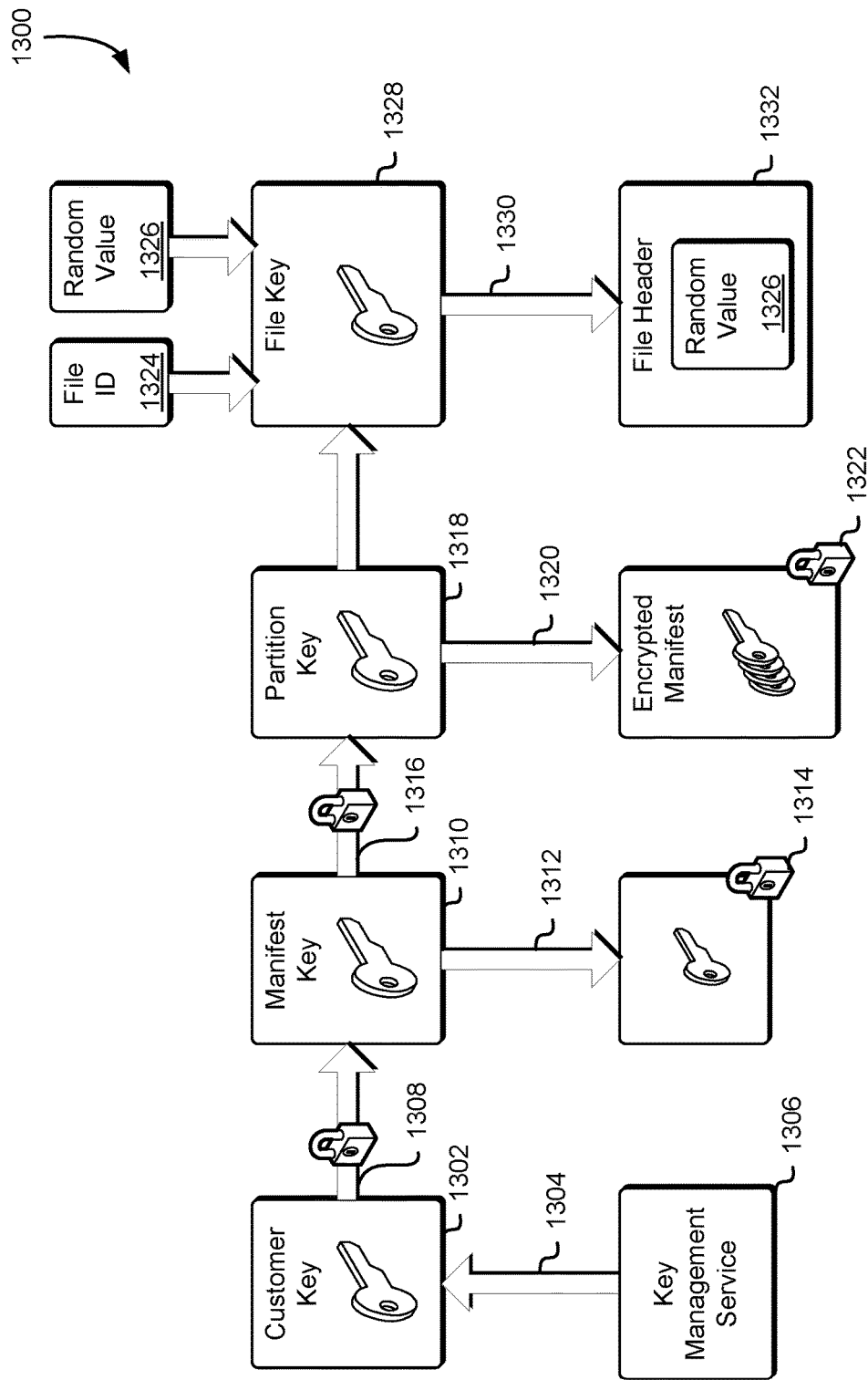
FIG. 13 illustrates an example environment showing a key hierarchy for encryption of stored data in a storage service system.

FIG. 13 illustrates an example environment 1300 showing a key hierarchy for encryption of stored data in a storage service system as described at least in connection with FIG. 1 and in accordance with an embodiment. A customer key 1302 is received 1304 from a key management service 1306 as described above. The customer key is used, during provisioning, to encrypt 1308 a manifest key 1310 that may also be received from a key management service and/or may be randomly generated. The encrypted manifest key or a second key based on the encrypted manifest key is stored 1312 in the cryptoprocessor 1314 during provisioning of the storage service system so that, at the destination, the encrypted key manifest can be decrypted. The manifest key 1310 is then used to encrypt 1316 one or more partition keys 1318 where each partition of the storage service system has a separate key. The encrypted one or more partition keys 1318 form 1320 the encrypted key manifest 1322, described herein.

When the storage service system is used to store data or retrieve data, each partition key of the one or more partition keys 1318 is extracted from the encrypted key manifest 1322 using the manifest key 1310 in the cryptoprocessor. The partition key of the one or more partition keys 1318 is used to generate a file key 1328 by cryptographically combining the partition key with a file identifier ("ID") of the file 1324 and a random value 1326 used to seed the process of generating the file key 1328. In an embodiment, only the random value 1326 used to seed the process of generating the file key 1328 is stored 1330 in a file header 1332 corresponding to the file (e.g., the file header 1210 described in connection with FIG. 12).

Figure 14:
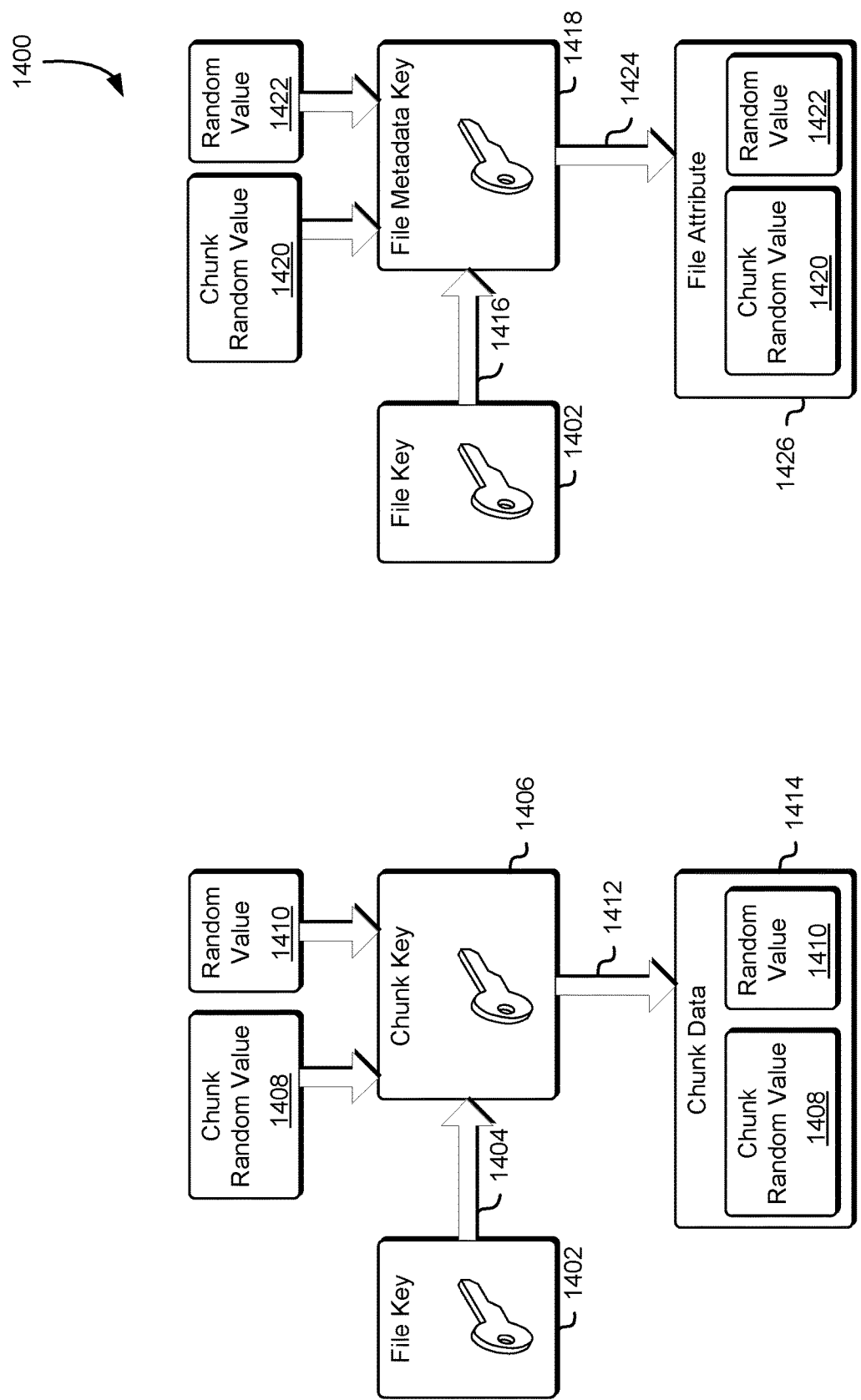
FIG. 14 illustrates an example environment showing derived keys of a key hierarchy for encryption of stored data in a storage service system.

FIG. 14 illustrates an example environment 1400 showing derived keys of a key hierarchy for encryption of stored data in a storage service system as described at least in connection with FIG. 1 and in accordance with an embodiment. The file key 1402, which is the same as the file key 1328 described in connection with FIG. 13, is used to generate 1404 a chunk key 1406 by cryptographically combining the file key 1402 with a chunk random value 1408 and a random value 1410. In an embodiment, the chunk random value 1408 is a random value that is used for multiple chunks and the random value 1410 is a different random value for each chunk. For example, a chunk random value 1408 may be used for 32,768 chunks (32 times 1024) and each 1 MB chunk may have a different random value 1410. In the example illustrated in FIG. 14, the chunk key 1406 is not stored, the chunk random value 1408 is stored 1412 with the chunk data 1414, and the random value 1410 is stored 1412 with the chunk data 1414. In an embodiment, only the random value 1410 is stored 1412 with the chunk data 1414 and the chunk random value is calculated on the fly or obtained from a lookup table or array of random values based at least in part on an identifier associated with the chunk. The file key 1402, the chunk random value 1408, and the random value 1410 may then be used to regenerate the chunk key 1406 as needed.

The file key 1402 is used to generate 1416 a file metadata key 1418 by cryptographically combining the file key 1402 with the chunk random value 1420 (which is the same as the chunk random value 1408) and a random value 1422. In the example illustrated in FIG. 14, the file metadata key 1418 is not stored, the chunk random value 1420 is stored 1424 as a file attribute 1426 of the file, and the random value 1422 is stored 1424 with the file attribute 1426. In an embodiment, only the random value 1422 is stored 1424 with the file attribute 1426 and the chunk random value is calculated on the fly or obtained from a lookup table or array of random values based at least in part on an identifier associated with the chunk. The file key 1402, the chunk random value 1420, and the random value 1422 may then be used to regenerate the file metadata key 1418 as needed.

Figure 15:
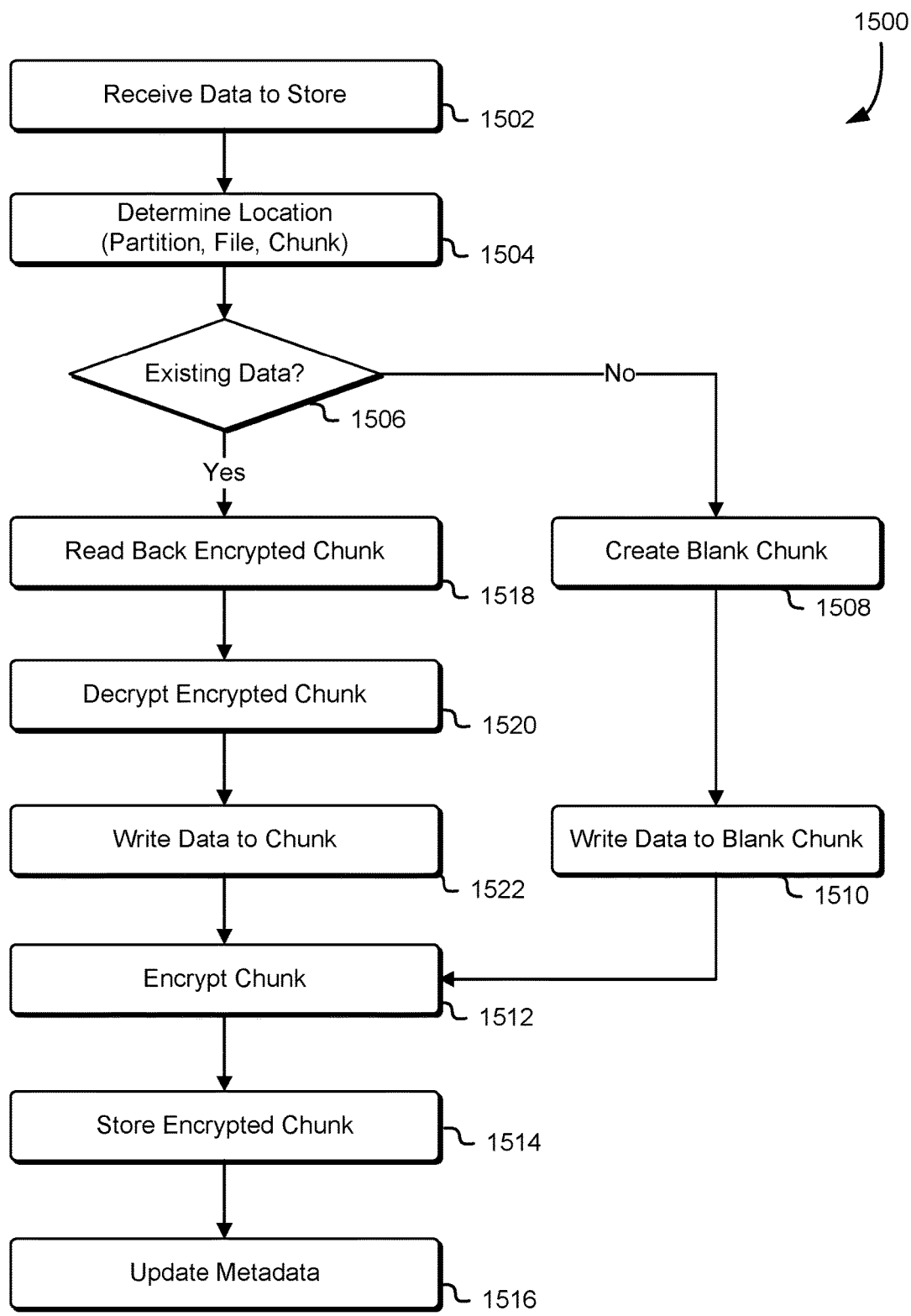
FIG. 15 illustrates an example process for where writing random access data is performed using a storage service system.

FIG. 15 illustrates an example process 1500 for writing random access data is performed using a storage service system as described at least in connection with FIG. 1 and in accordance with an embodiment. A storage service system such as the storage service system 108 described in connection with FIG. 1 may perform the example process 1500 illustrated in FIG. 15. The storage service system first receives 1502 the data to store in the storage service system. Based at least in part on the organization of the stored encrypted data, the storage service system determines 1504 the location where the data should be stored (e.g., the partition, file, and chunk of the data). If there is not existing data 1506 already stored in that chunk, the storage service system may create 1508 a blank chunk, may write 1510 that data to the blank chunk, may encrypt 1512 the chunk using the file system abstraction layer, may store 1514 the encrypted chunk using the storage layer of the storage service system, and may update 1516 any metadata associated with the chunk. In an embodiment, the storage service system may only create 1508 a blank chunk if the data is being stored at a location other than the beginning of the chunk.

If there is existing data 1506 already stored in the chunk where the data is to be written, the storage service system may read 1518 the encrypted chunk from the storage layer of the storage service system, decrypt 1520 the encrypted chunk, and write 1522 the data to be stored to the correct location in the decrypted chunk (i.e., written to the plaintext buffer of the decrypted chunk). The storage service system may then encrypt 1512 the chunk using the file system abstraction layer, store 1514 the encrypted chunk using the storage layer of the storage service system, and update 1516 any metadata associated with the chunk.

FIG. 16 illustrates an example environment 1600 showing the first two steps of an autonomous communication protocol of a storage service system as described at least in connection with FIG. 1 and in accordance with an embodiment. At iteration zero 1616 of the autonomous communication protocol (also referred to herein as a "gossip protocol"), a first server 1602 has the data 1614. At iteration zero 1616 of the gossip protocol, the second server 1604, the third server 1606, the fourth server 1608, the fifth server 1610, and the sixth server 1612 do not have the data 1614.

At iteration one 1618 of the gossip protocol, the first server 1602 selects 1620 the second server 1604 and provides the data 1614 to the second server 1604. The first server 1602 may select the server randomly or using a selection protocol. After iteration one 1618 of the gossip protocol, the third server 1606, the fourth server 1608, the fifth server 1610, and the sixth server 1612 do not have the data 1614.

FIG. 17 illustrates an example environment 1700 showing the second two steps of an autonomous communication protocol of a storage service system as described at least in connection with FIG. 1 and in accordance with an embodiment. In the example illustrated in FIG. 17, the first server 1702 is the same as the first server 1602, the second server 1704 is the same as the second server 1604, the third server 1706 is the same as the third server 1606, the fourth server 1708 is the same as the fourth server 1608, the fifth server 1710 is the same as the fifth server 1610, the sixth server 1712 is the same as the sixth server 1612, and the data 1714 is the same as the data 1614.

At iteration two 1716 of the gossip protocol, the first server 1702 selects 1720 the fifth server 1710 and provides the data 1714 to the fifth server 1710, and the second server 1704 selects 1722 the third server 1706 and provides the data 1714 to the third server 1706. After iteration two 1716 of the gossip protocol, the fourth server 1708 and the sixth server 1712 do not have the data 1714.

At iteration three 1718 of the gossip protocol, the first server 1702 again selects 1724 the fifth server 1710, which already has the data, the second server 1704 selects 1726 the first server 1702, which also already has the data, and the third server 1706 selects 1728 the sixth server 1712 and provides the data 1714 to the sixth server 1712. In an embodiment where the gossip protocol does not select the servers at random but, instead, selects the servers using a selection protocol, the selection of servers that already have the data (e.g., the first server 1702) may be reduced or eliminated. After iteration three 1718 of the gossip protocol, the fourth server 1708 does not have the data 1714.

Figure 18:
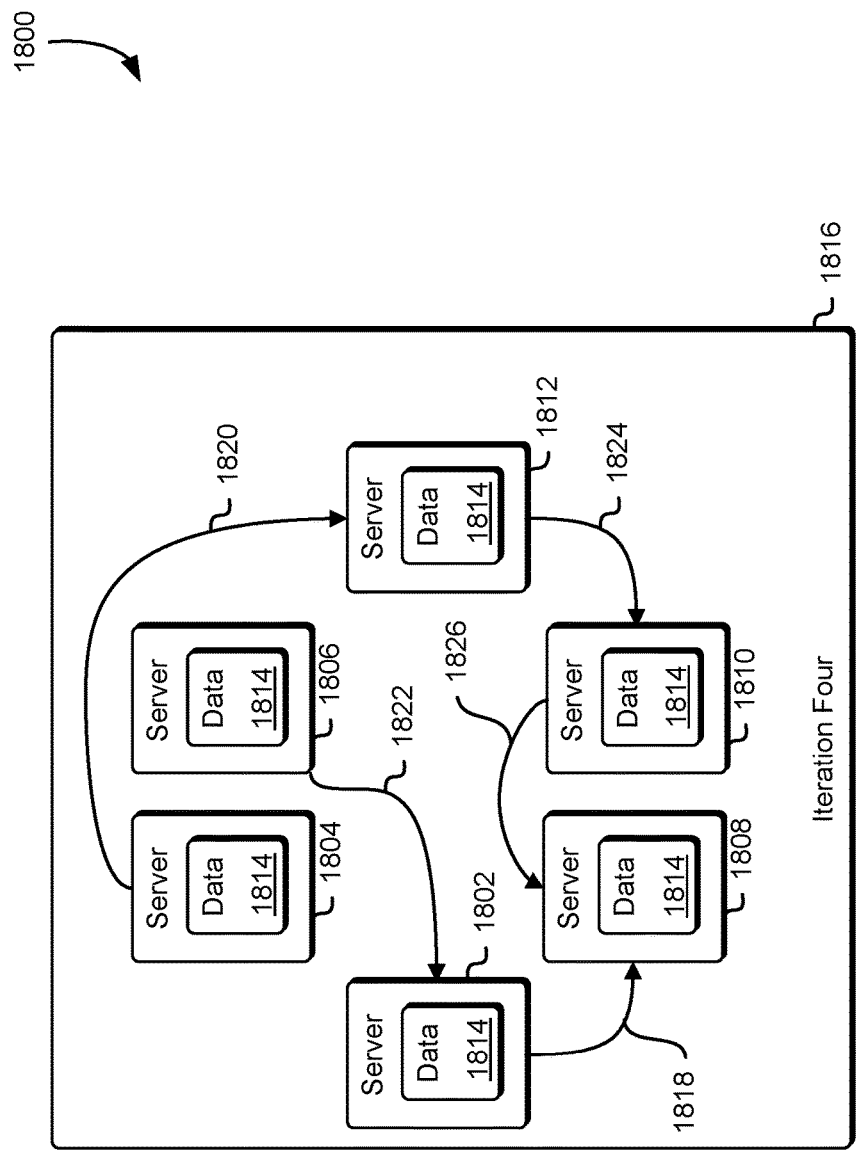
FIG. 18 illustrates an example environment showing the final steps of an autonomous communication protocol of a storage service system.

FIG. 18 illustrates an example environment 1800 showing the final steps of an autonomous communication protocol of a storage service system as described at least in connection with FIG. 1 and in accordance with an embodiment. In the example illustrated in FIG. 18, the first server 1802 is the same as the first server 1602 and the same as the first server 1702, the second server 1804 is the same as the second server 1604 and the same as the second server 1704, the third server 1806 is the same as the third server 1606 and the same as the third server 1706, the fourth server 1808 is the same as the fourth server 1608 and the same as the fourth server 1708, the fifth server 1810 is the same as the fifth server 1610 and the same as the fifth server 1710, the sixth server 1812 is the same as the sixth server 1612 and the same as the sixth server 1712, and the data 1814 is the same as the data 1614 and the same as the data 1714.

At iteration four 1816 of the gossip protocol, the second server 1804 selects 1820 the sixth server 1812, which also already has the data, the third server 1806 selects 1822 the first server 1802, which also already has the data, and the sixth server 1812 selects 1824 the fifth server 1810, which also already has the data. At iteration four 1816 of the gossip protocol, the first server 1802 selects 1818 the fourth server 1808 and provides the data 1814 to the fourth server 1808 and the fifth server 1810 also selects 1826 the fourth server 1808. After iteration four 1816 of the gossip protocol, all servers have the data 1814.

In an embodiment, the gossip protocol is a cluster management protocol that manages the servers in the layer as a cluster. Such a cluster management protocol may provide a control plane for servers of the cluster or layer. For example, the gossip protocol for the computation layer of a storage service system may be a cluster management protocol such as, for example, Serf, which can, in an embodiment, provide a control plane for the servers in the computation layer. As used herein, a control plane for a cluster of servers may provide command and control functionality for the servers including, but not limited to, providing a mechanism for routing messages between the servers.

Figure 19:
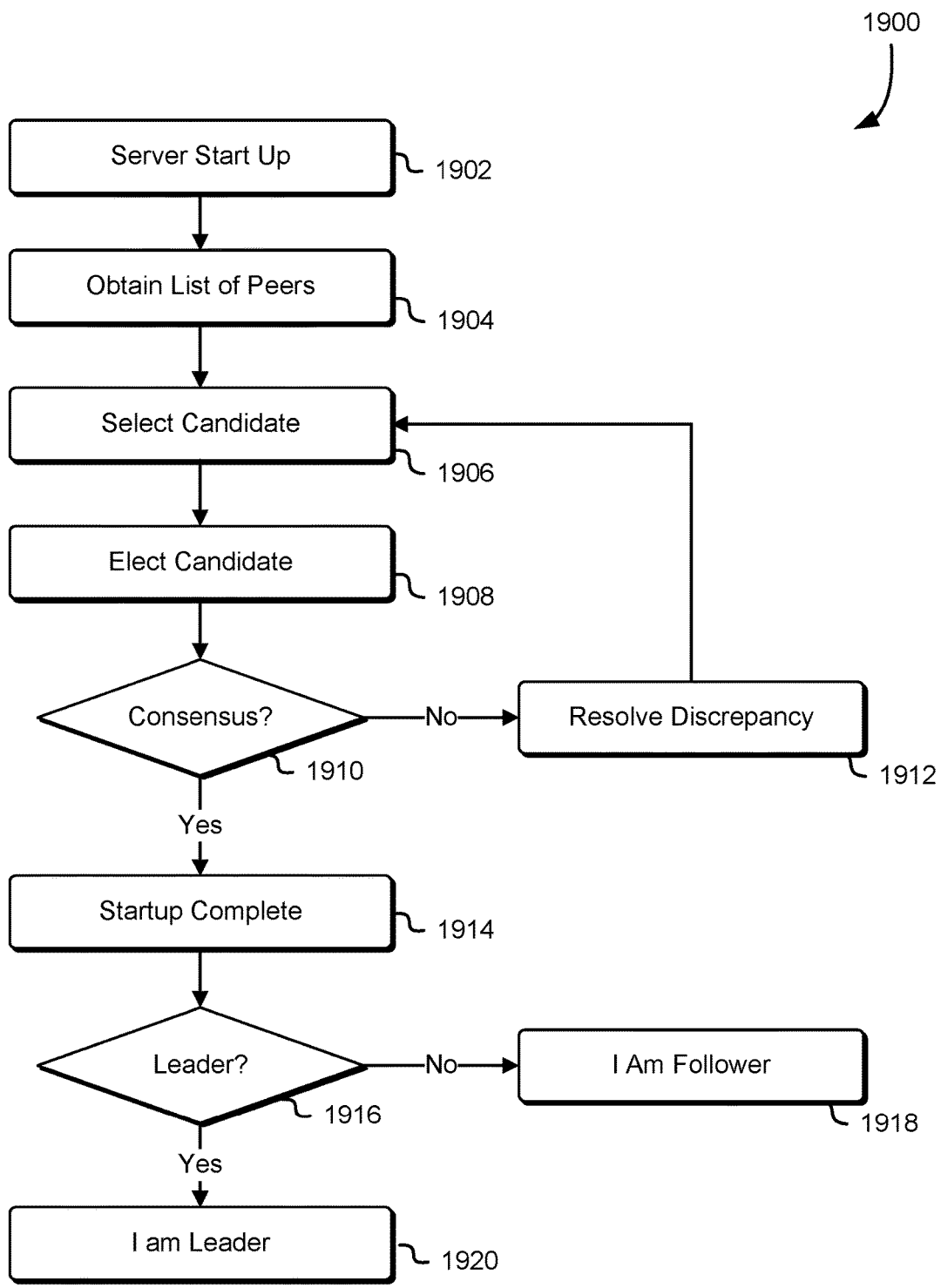
FIG. 19 illustrates an example process for managing server control using an autonomous communication protocol of a storage service system.

FIG. 19 illustrates an example process 1900 for managing server control using an autonomous communication protocol of a storage service system as described at least in connection with FIG. 1 and in accordance with an embodiment. A storage service system such as the storage service system 108 described in connection with FIG. 1 may perform the example process 1900 illustrated in FIG. 19. The example process 1900 described in connection with FIG. 19 is used to determine which server of the computation servers of the storage service system is the leader (or "master") and which servers of the computation servers of the storage service system are the followers (or "slaves"). In an embodiment, there is exactly one leader and the computation servers that are not the leader are all followers. In another embodiment, the computation servers may be partitioned or clustered and, in such an embodiment, there may be one leader per cluster. In an embodiment, the storage servers of the storage service system can perform the example process 1900 illustrated in FIG. 19 to determine a leader and followers of the storage servers of the storage service system.

When a server is started 1902, the server obtains 1904 a list of peers. The list of peers is a list of the other servers in the same layer or cluster of the storage service system. The server then selects 1906 a candidate for the leader from the list of peers. In an embodiment, the server selects the candidate based on the internet protocol ("IP") address of the candidate from the list of peers. For example, the server may select the candidate with the lowest IP address or with the highest IP address. The server may also select a candidate randomly or based on some other selection criteria.

The server may then elect 1908 the selected candidate by notifying all of the servers in the layer or cluster. If all servers elect the same candidate, there is a consensus 1910 and that candidate is the leader. If some servers select different candidates because, for example, there is a network partition and two servers have the lowest IP address, then there is no consensus 1910. If there is no consensus 1910, the servers may try to resolve the discrepancy 1912 using some other selection criteria.

When the consensus 1910 is reached, the election phase of the startup is complete 1914. A server may then determine 1916 whether it is the leader. If the server is not the leader, it is a follower 1918. If the server is the leader 1920, it may then function as the leader among the servers in that layer or cluster in the storage service system.

Figure 20:
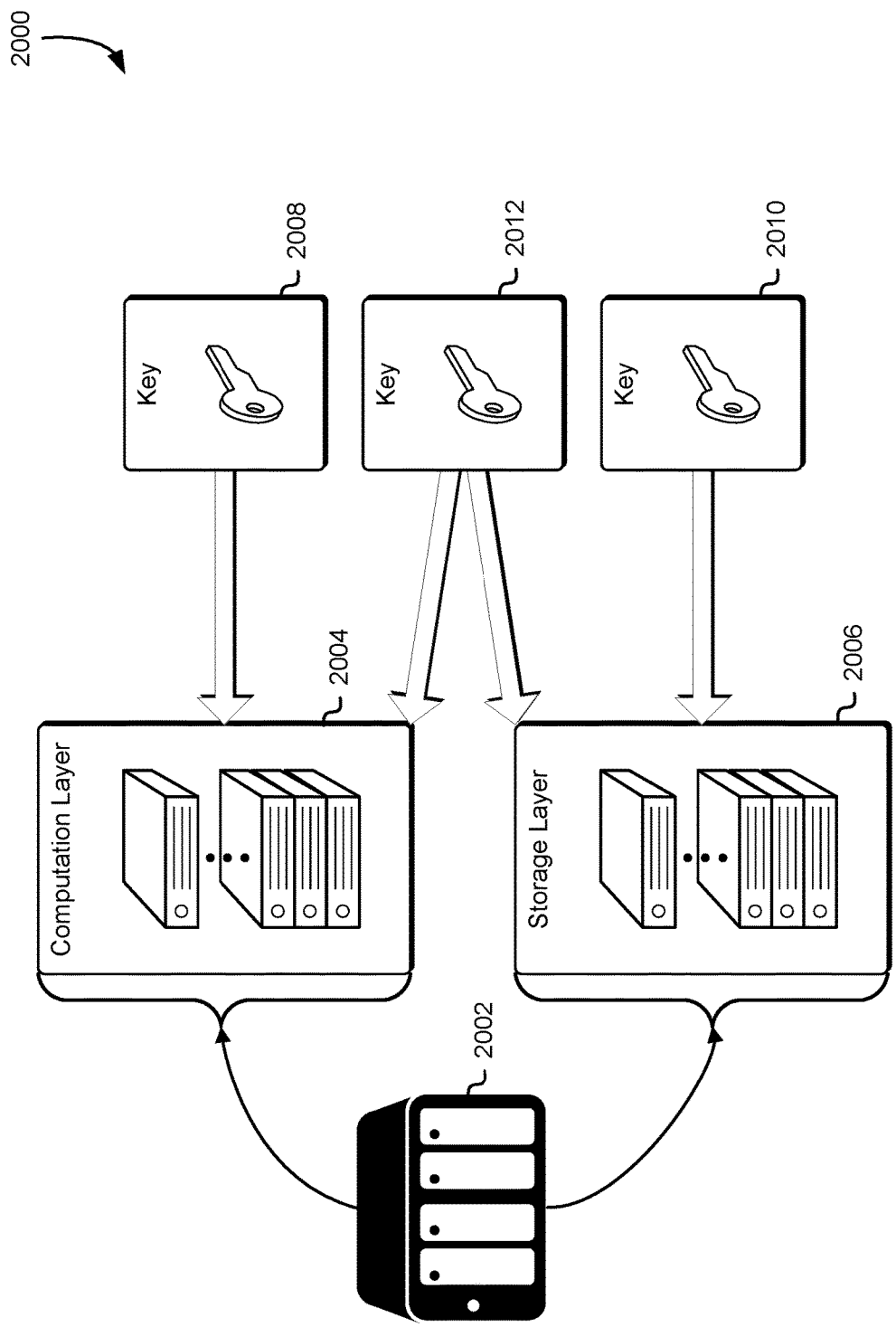
FIG. 20 illustrates an example environment where server group isolation is maintained for an autonomous communication protocol of a storage service system.

FIG. 20 illustrates an example environment 2000 where server group isolation is maintained for an autonomous communication protocol of a storage service system as described at least in connection with FIG. 1 and in accordance with an embodiment. In the example illustrated in FIG. 20, the computation layer 2004 of the storage service system 2002 has a first key 2008 that allows the servers in the computation layer 2004 to communicate with one another according to a gossip protocol using encrypted messages, where the encrypted messages are generated using the first key 2008. The first key 2008 is shared among the servers of the computation layer 2004 of the storage service system 2002 and is not shared with the servers in the storage layer 2006 of the storage service system 2002. The first key 2008 may be used to, for example, elect the leader of the servers in the computation layer 2004.

In the example illustrated in FIG. 20, the storage layer 2006 of the storage service system 2002 has a second key 2010 that allows the servers in the storage layer 2006 to communicate with one another according to a gossip protocol using encrypted messages, where the encrypted messages are generated using the second key 2010. The second key 2010 is shared among the servers of the storage layer 2006 of the storage service system 2002 and is not shared with the servers in the computation layer 2004 of the storage service system 2002. The second key 2010 may be used to, for example, monitor the health of the servers in the storage layer 2006 and provide coordination between the servers in the storage layer 2006.

In the example illustrated in FIG. 20, the computation layer 2004 and the storage layer 2006 of the storage service system 2002 share a third key 2012 that allows the servers in the storage layer 2006 to communicate with the servers of the computation layer according to a gossip protocol using encrypted messages, where the encrypted messages are generated using the third key 2012. The third key 2012 is shared among the servers of the storage layer 2006 of the storage service system 2002 and is also shared among the servers in the computation layer 2004 of the storage service system 2002. The third key 2012 may be used to, for example, send commands from the computation layer 2004 of the storage service system 2002 to the storage layer 2006 of the storage service system 2002 and may also be used to send status updates and logging information from the storage layer 2006 of the storage service system 2002 to the computation layer 2004 of the storage service system 2002.

Figure 21:
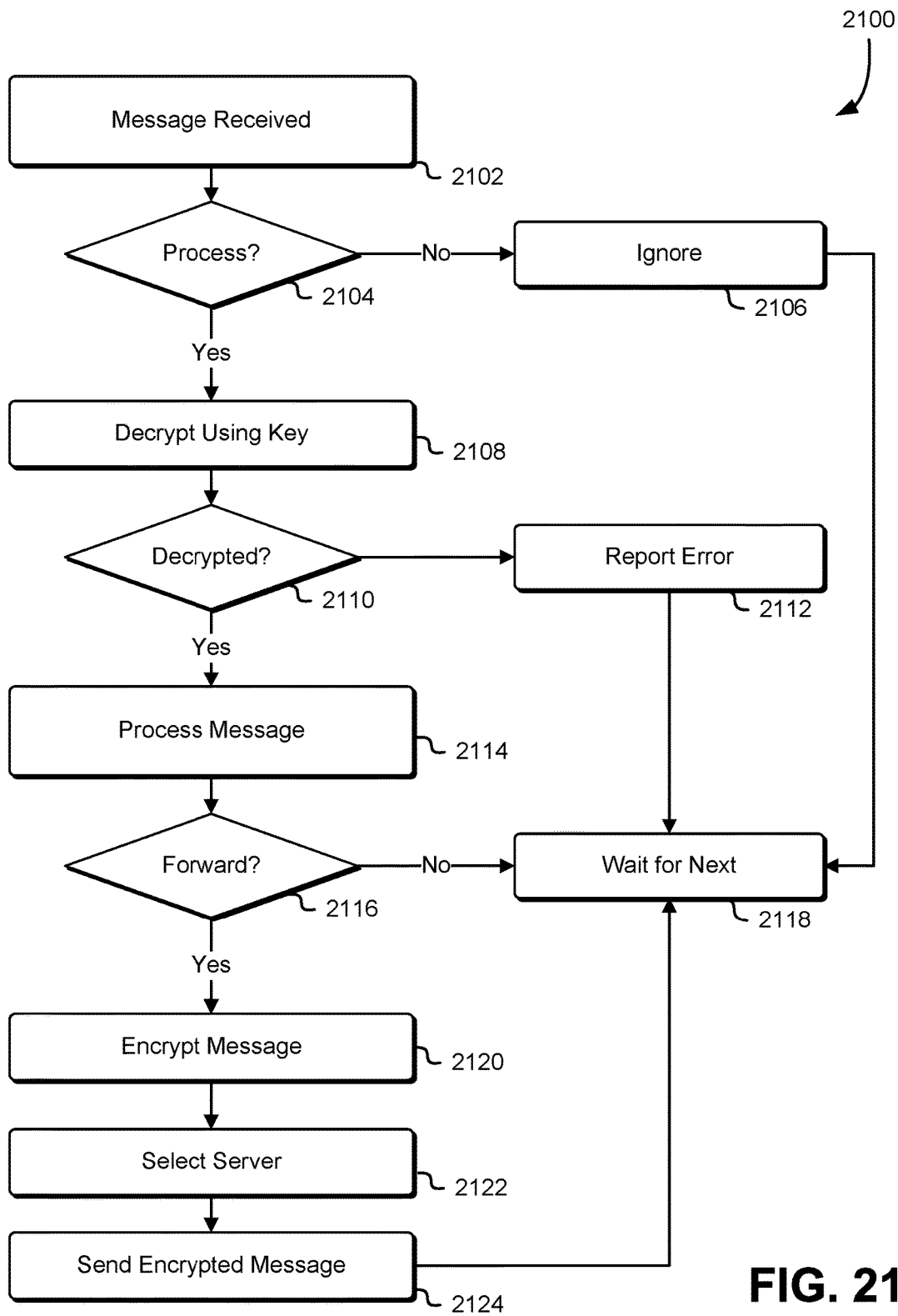
FIG. 21 illustrates an example process for sending commands and messages to servers in a server group using an autonomous communication protocol of a storage service system.

FIG. 21 illustrates an example process 2100 for sending commands and messages to servers in a server group using an autonomous communication protocol of a storage service system as described at least in connection with FIG. 1 and in accordance with an embodiment. A storage service system such as the storage service system 108 described in connection with FIG. 1 may perform the example process 2100 illustrated in FIG. 21. When the storage service system receives 2102 a message with information, commands, or data that should be processed and/or provided to other servers in the storage service system, the storage service system first determines 2104 whether it should process the message. In an embodiment, the server may determine to not process messages that have been previously received. For example, each message may include a message identifier ("ID"). If the server has already received a message with that message identifier, the server may ignore 2106 that message as it has already decrypted and processed that information, command, or data. The server may then wait 2118 for the next message.

If the storage service system determines 2104 that it should process the message, the server will decrypt 2108 the message using the appropriate key as described above. If the message is not decrypted 2110 successfully, the server may report 2112 a decryption error using, for example, a logging service and may then wait 2118 for the next message. If the message is decrypted 2110 successfully, the server may process 2114 the message. The server may next determine whether to forward 2116 the message to other servers. For example, messages that store data should not be forwarded since, as may be contemplated, only one server should store the data. Conversely, messages that relate to command and control of the server such as, for example, when electing a leader, should be forwarded.

If the server does not forward 2116 the message, the server may then wait 2118 for the next message. If the server does forward 2116 the message, the server may encrypt 2120 the message using the appropriate key, select 2122 a server according to the gossip protocol, and send 2124 the encrypted message to the selected server. In an embodiment, the server broadcasts the message to all servers in the layer or cluster.

Figure 22:
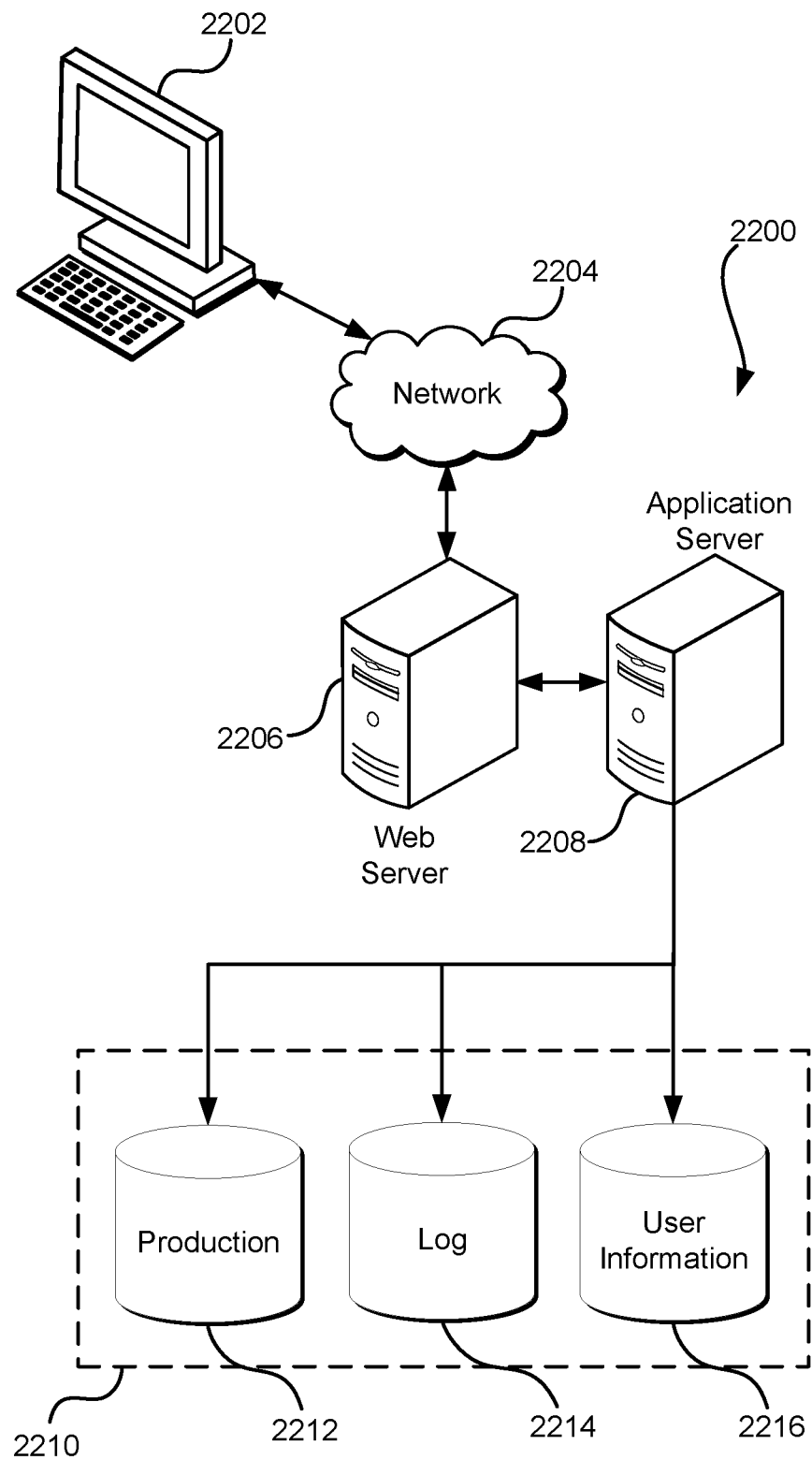
FIG. 22 illustrates an environment in which various embodiments can be implemented.

FIG. 22 illustrates aspects of an example environment 2200 for implementing aspects in accordance with various embodiments. As will be appreciated, although a web-based environment is used for purposes of explanation, different environments may be used, as appropriate, to implement various embodiments. The environment includes an electronic client device 2202, which can include any appropriate device operable to send and/or receive requests, messages, or information over an appropriate network 2204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 2206 for receiving requests and serving content in response thereto, although for other networks an alternative device serving a similar purpose could be used as would be apparent to one of ordinary skill in the art.

The illustrative environment includes at least one application server 2208 and a data store 2210. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 2202 and the application server 2208, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 2210 can include several separate data tables, databases, data documents, dynamic data storage schemes, and/or other data storage mechanisms and media for storing data relating to a particular aspect of the present disclosure. For example, the data store illustrated may include mechanisms for storing production data 2212 and user information 2216, which can be used to serve content for the production side. The data store also is shown to include a mechanism for storing log data 2214, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 2210. The data store 2210 is operable, through logic associated therewith, to receive instructions from the application server 2208 and obtain, update, or otherwise process data in response thereto. The application server 2208 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 2202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 22. Thus, the depiction of the system 2200 in FIG. 22 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    delivering, to a customer of a computing resource service provider, a mobile storage service system, the mobile storage service system including a computation layer with a plurality of computation servers and a storage layer with a plurality of storage servers, each computation server of the plurality of computation server and each storage server of the plurality of storage servers being a computer system with one or more executable instructions;
    receiving, at the computation layer, an encrypted key manifest generated by a key management service of the computing resource service provider and encrypted using a first cryptographic key;
    decrypting the encrypted key manifest within a cryptoprocessor of a computation server of the computation layer to produce a partition key, the cryptoprocessor at least including a second cryptographic key corresponding to the first cryptographic key usable to decrypt the encrypted key manifest;
    providing, to a file system abstraction layer of the computation server, the partition key, the file system abstraction layer providing an interface to a storage layer of the mobile storage service system;
    receiving a set of data to store in the mobile storage service system;
    encrypting, using the computation server, the set of data to produce an encrypted set of data, the encrypting based at least in part on the partition key;
    storing the encrypted set of data in the storage layer using the file system abstraction layer;
    returning the mobile storage service system to a facility of the computing resource service provider; and
    transferring the set of data from the mobile storage service system to a datacenter of the computing resource service provider.

2. The computer-implemented method of claim 1, further comprising:
    provisioning each computation server of the plurality of computation servers by at least:
        installing a first shared boot image on the each computation server; and
        installing the second cryptographic key in the cryptoprocessor of the each computation server;
    provisioning each storage server of the plurality of storage servers by at least installing a second shared boot image on the each storage server; and
    encrypting the key manifest to produce an encrypted key manifest using the first cryptographic key.

3. The computer-implemented method of claim 1, wherein storing the set of data in the datacenter of the computing resource service provider includes:
    providing the encrypted key manifest to the computation layer;
    decrypting the encrypted key manifest within the cryptoprocessor to generate the partition key;
    providing the partition key to the file system abstraction layer;
    retrieving a set of encrypted data from the storage layer using the file system abstraction layer;
    decrypting the set of encrypted data to produce an decrypted set of data using a key based at least in part on the partition key; and
    providing the decrypted set of data to the datacenter of the computing resource service provider.

4. The computer-implemented method of claim 1, wherein encrypting the set of data to produce the encrypted set of data includes:
    generating a file key from the partition key, a first identifier associated with the set of data, and a random value;
    generating a chunk key from the file key, a second identifier associated with a subset of the set of data, and a random value; and
    encrypting the set of data to produce the encrypted set of data using the chunk key.

5. A system, comprising:
    a first set of computer systems with at least one computing device configured with processors and memory, the memory including instructions executable to cause the system to:
        receive an encrypted key manifest encrypted using a first cryptographic key;
        decrypt the encrypted key manifest using a cryptoprocessor to produce a partition key;
        provide the partition key to a file system abstraction layer, the file system abstraction layer providing an interface to a second set of computer systems with at least one computing device configured with processors and memory, the memory including instructions that, upon execution, cause the system to store encrypted data in the second set of computer systems;
        receive a set of data to store;
        encrypt the set of data to produce an encrypted set of data based at least in part on the partition key; and
        provide the encrypted set of data to the second set of computer systems using the file system abstraction layer.

6. The system of claim 5, wherein the system verifies that each computer system of the first set of computer systems has not been tampered with prior to receiving the encrypted key manifest.

7. The system of claim 5, wherein the system is returned to a facility of a computing resource service provider after the encrypted set of data is provided to the second set of computer systems.

8. The system of claim 7, wherein, after the system is returned to a facility of a computing resource service provider, the first set of computer systems:
receive the encrypted key manifest;
decrypt the encrypted key manifest using the secure cryptoprocessor to produce a partition key;
provide the partition key to the file system abstraction layer;
retrieve a set of encrypted data from the second set of computer systems using the file system abstraction layer;
decrypt the set of encrypted data to produce an decrypted set of data using a key based at least in part on the partition key; and
transfer the set of data from the system to a datacenter of the computing resource service provider.

9. The system of claim 5, wherein:
a computer system of the first set of computer systems generates a file key from the partition key, a first identifier of the set of data, and a first random value;
the computer system encrypts the set of data to produce the encrypted set of data using the file key; and
the computer system provides the first random value to the second set of computer systems with the encrypted set of data using the file system abstraction layer.

10. The system of claim 9, wherein:
the computer system generates a chunk key from the file key, a second random value, and a third random value;
the computer system encrypts a subset of the set of data to produce an encrypted subset of the set of data using the chunk key; and
the computer system provides the second random value and the third random value to the second set of computer systems with the encrypted subset of the set of data using the file system abstraction layer.

11. The system of claim 9, wherein:
the computer system generates a metadata key from the file key, a second random value, and a third random value;
the computer system encrypts a set of metadata to produce an encrypted set of metadata using the metadata key, the set of metadata associated with the set of data;
the computer system stores the encrypted set of metadata as a file attribute of the encrypted set of data; and
the computer system provides the second random value and the third random value to the second set of computer systems with the encrypted set of data using the file system abstraction layer.

12. The system of claim 11, wherein the set of metadata includes at least one of: a folder name, a file name, a directory name, a time of creation, a time of last modification, a time of last access, a checksum, or a user-defined file attribute.

13. A system, comprising:
a set of computer systems with at least one computing device comprising one or more processors and memory, the memory including instructions executable to cause the system to:
provision a storage service system by causing the system to at least:
encrypt a key manifest to produce an encrypted key manifest using a first cryptographic key; and
install a second cryptographic key associated with the first cryptographic key in a cryptoprocessor of each computation server of a plurality of computation servers of the storage service system;
store data in a storage layer of the storage service system when the storage service system is located at a first location, the data encrypted based at least in part on a partition key, the partition key obtained by decrypting the encrypted key manifest in the cryptoprocessor using the second cryptographic key; and
retrieve the data from the storage service system when the storage service system is located at a second location.

14. The system of claim 13, wherein the executable instructions that provision the storage service system further include executable instructions to:
install a first shared boot image on each computation server of the plurality of computation servers of the storage service system; and
install a second shared boot image on each storage server of a plurality of storage servers of the storage service system.

15. The system of claim 13, wherein the executable instructions that store data in the storage service system further include executable instructions to:
store the encrypted set of data in a storage layer of the storage service system using a file system abstraction layer.

16. The system of claim 15, wherein the executable instructions that store the encrypted set of data in a storage layer of the storage service system using a file system abstraction layer further include executable instructions to:
retrieve a first encrypted chunk of data from the storage service using the file system abstraction layer;
decrypt, in a computation layer of the storage service system, the first encrypted chunk of data using a chunk key to produce a decrypted chunk of data, the chunk key generated based at least in part on the partition key;
store the set of data in the decrypted chunk of data;
encrypt the decrypted chunk of data using the chunk key to produce a second encrypted chunk of data; and
store the second encrypted chunk of data in the storage layer of the storage service system.

17. The system of claim 13, wherein the executable instructions that retrieve data from the storage service system further include executable instructions to:
decrypt an encrypted key manifest to produce a partition key using a cryptoprocessor;
retrieve a set of encrypted data from a storage layer of the storage service system;
decrypt the set of encrypted data in a computation layer of the storage service system using the partition key; and
store the decrypted set of encrypted data in a datacenter at the second location.

18. The system of claim 13, wherein:
an encrypted key manifest is provided to a first computation server of a plurality of computation servers of the storage service system;
the encrypted key manifest is decrypted to produce a partition key using a cryptoprocessor; and
the partition key is provided by the first computation server to each computation server of the plurality of computation servers using a gossip protocol.

19. The system of claim 13, wherein the storage service system is contained in a commercial shipping container.

20. The system of claim 13, wherein the storage service system is provisioned at a third location.

* * * * *